(12) United States Patent
Hiscock

(10) Patent No.: US 9,413,547 B2
(45) Date of Patent: *Aug. 9, 2016

(54) OPEN NETWORK CONNECTIONS

(75) Inventor: James Scott Hiscock, Rockport, MA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1185 days.

This patent is subject to a terminal disclaimer.

(21) Appl. No.: 13/304,104

(22) Filed: Nov. 23, 2011

(65) Prior Publication Data

US 2012/0069770 A1    Mar. 22, 2012

Related U.S. Application Data

(62) Division of application No. 12/120,377, filed on May 14, 2008, now Pat. No. 8,085,662.

(51) Int. Cl.
| | |
|---|---|
| *H04L 12/28* | (2006.01) |
| *H04L 12/24* | (2006.01) |
| *H04L 12/701* | (2013.01) |
| *H04L 12/715* | (2013.01) |

(Continued)

(52) U.S. Cl.
CPC .............. *H04L 12/24* (2013.01); *H04L 41/00* (2013.01); *H04L 45/00* (2013.01); *H04L 45/64* (2013.01); *H04L 47/10* (2013.01); *H04L 47/125* (2013.01); *H04L 41/0213* (2013.01); *H04L 41/0893* (2013.01)

(58) Field of Classification Search
CPC ..... H04L 12/24; H04L 41/00; H04L 41/0213; H04L 41/0893; H04L 45/00; H04L 45/64; H04L 47/10; H04L 47/125

USPC .......... 370/349, 389, 328, 338, 230
See application file for complete search history.

(56) References Cited

U.S. PATENT DOCUMENTS

| | | | |
|---|---|---|---|
| 6,980,515 B1 | 12/2005 | Schunk et al. | |
| 7,327,757 B2 | 2/2008 | Ghahremani et al. | |

(Continued)

FOREIGN PATENT DOCUMENTS

| | | |
|---|---|---|
| CN | CN1518289 A | 8/2004 |
| CN | CN101068229 A | 11/2007 |

(Continued)

OTHER PUBLICATIONS

English translation of Abstract from Chinese Patent Publication No. CN101068229A.

(Continued)

*Primary Examiner* — Brenda H Pham
(74) *Attorney, Agent, or Firm* — Hewlett Packard Enterprise Patent Department

(57) ABSTRACT

One or more logical network connection points are provided within an electronic communications network. The logical network connections are provided via an interface between one or more connectivity plane devices and a network connected application, service, or control plane function in the electronic communication network. The network connected application, service, or control plane function registers itself as a logical network resident (NR) with a function in the connectivity plane that provides a logical network connection between the network resident and another logical network connection point.

13 Claims, 26 Drawing Sheets

(51) Int. Cl.
*H04L 12/801* (2013.01)
*H04L 12/803* (2013.01)

(56) References Cited

U.S. PATENT DOCUMENTS

| | | | |
|---|---|---|---|
| 7,539,134 | B1 | 5/2009 | Bowes |
| 8,085,662 | B2 * | 12/2011 | Hiscock .................. H04L 12/24 370/230 |
| 2003/0115482 | A1 | 6/2003 | Takihiro et al. |
| 2004/0076151 | A1 | 4/2004 | Fant et al. |
| 2005/0177733 | A1 * | 8/2005 | Stadelmann et al. ......... 713/185 |
| 2007/0086334 | A1 | 4/2007 | Wakumoto et al. |
| 2008/0049615 | A1 | 2/2008 | Bugenhagen |
| 2008/0049621 | A1 | 2/2008 | McGuire et al. |
| 2010/0135289 | A1 | 6/2010 | Bowes |

FOREIGN PATENT DOCUMENTS

| | | |
|---|---|---|
| TW | 571531 | 1/2004 |
| WO | WO2004084464 | 9/2004 |

OTHER PUBLICATIONS

English translation of Abstract from Chinese Patent Publication No. CN1518289A.

* cited by examiner

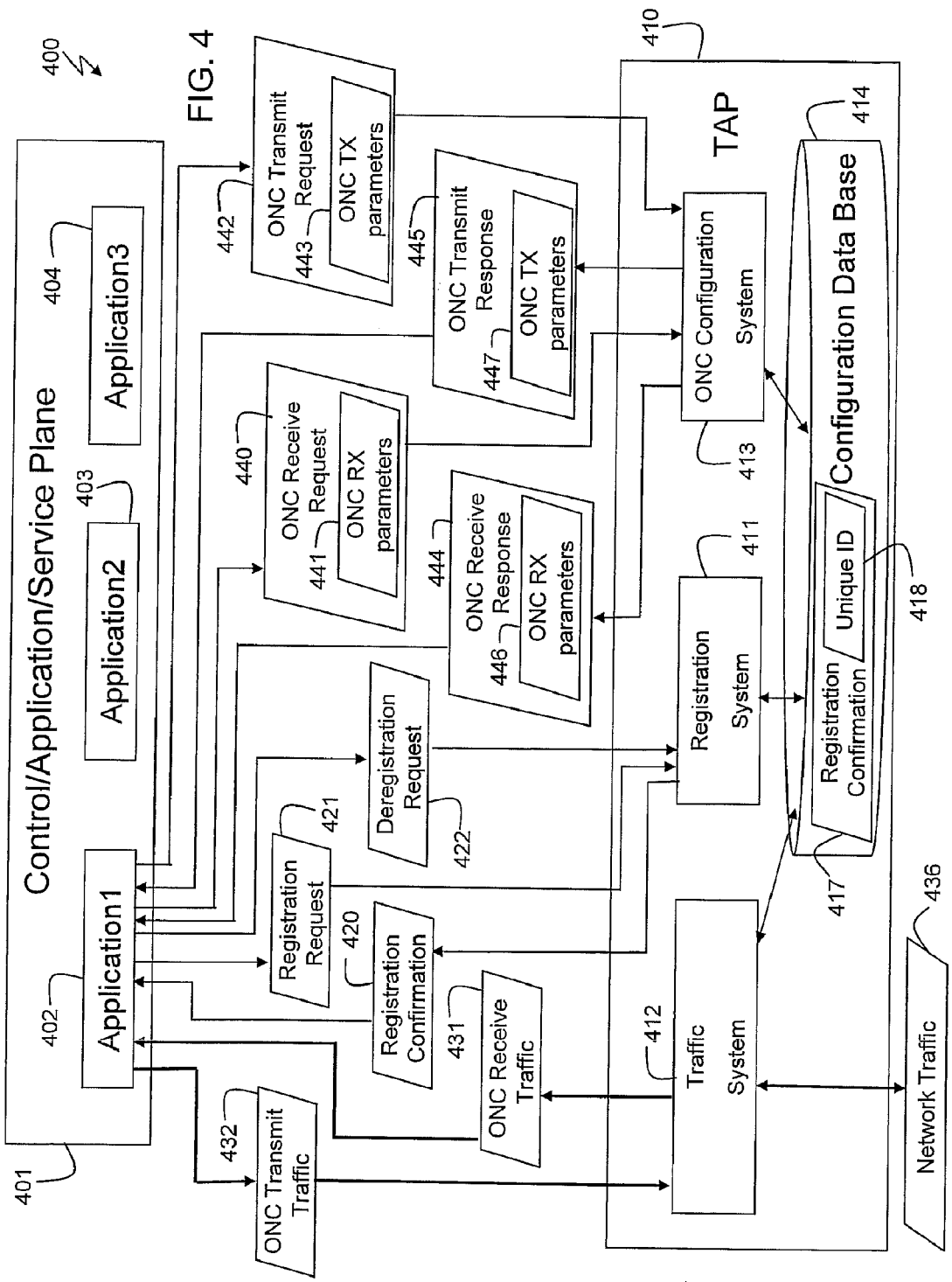

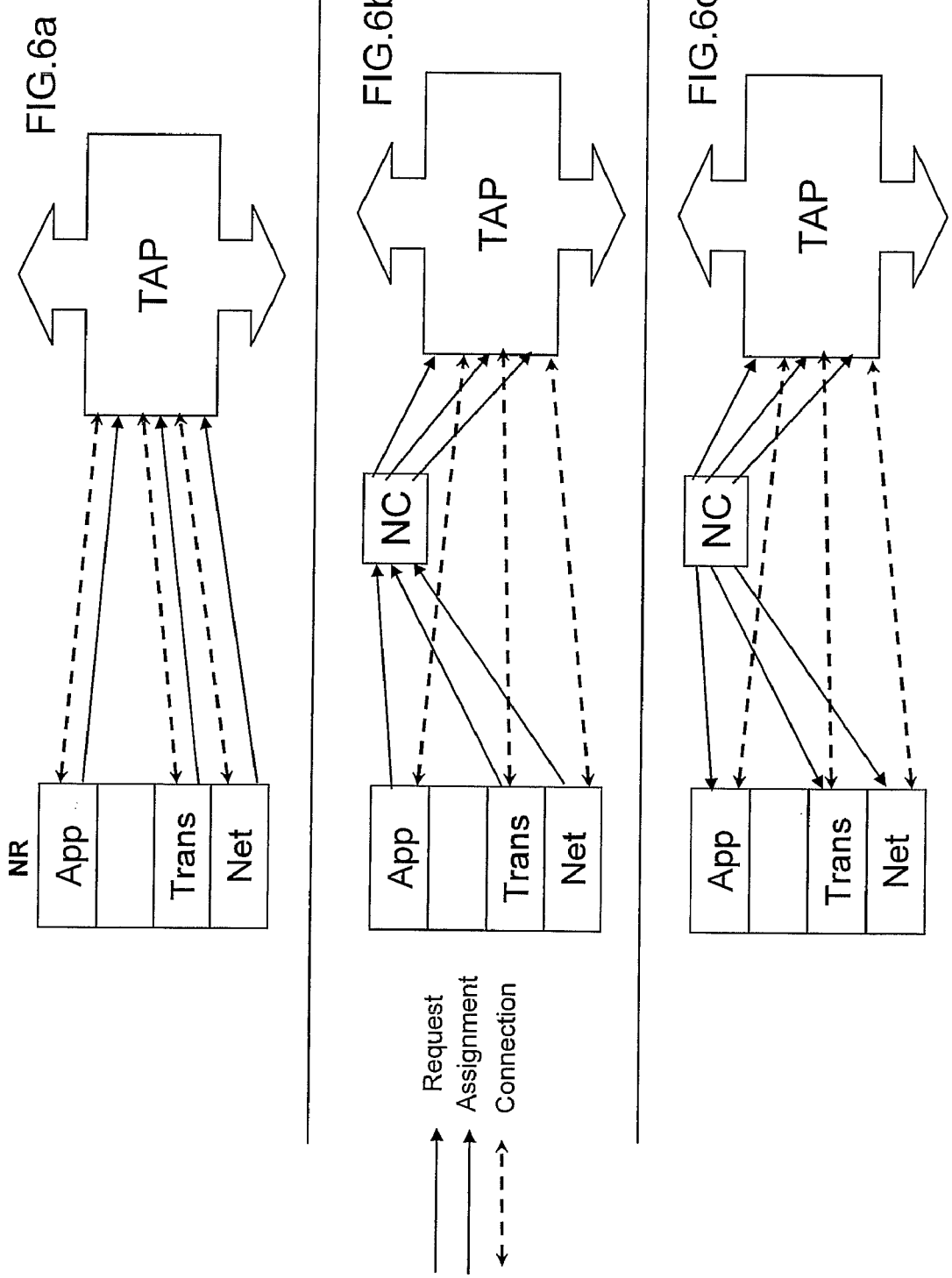

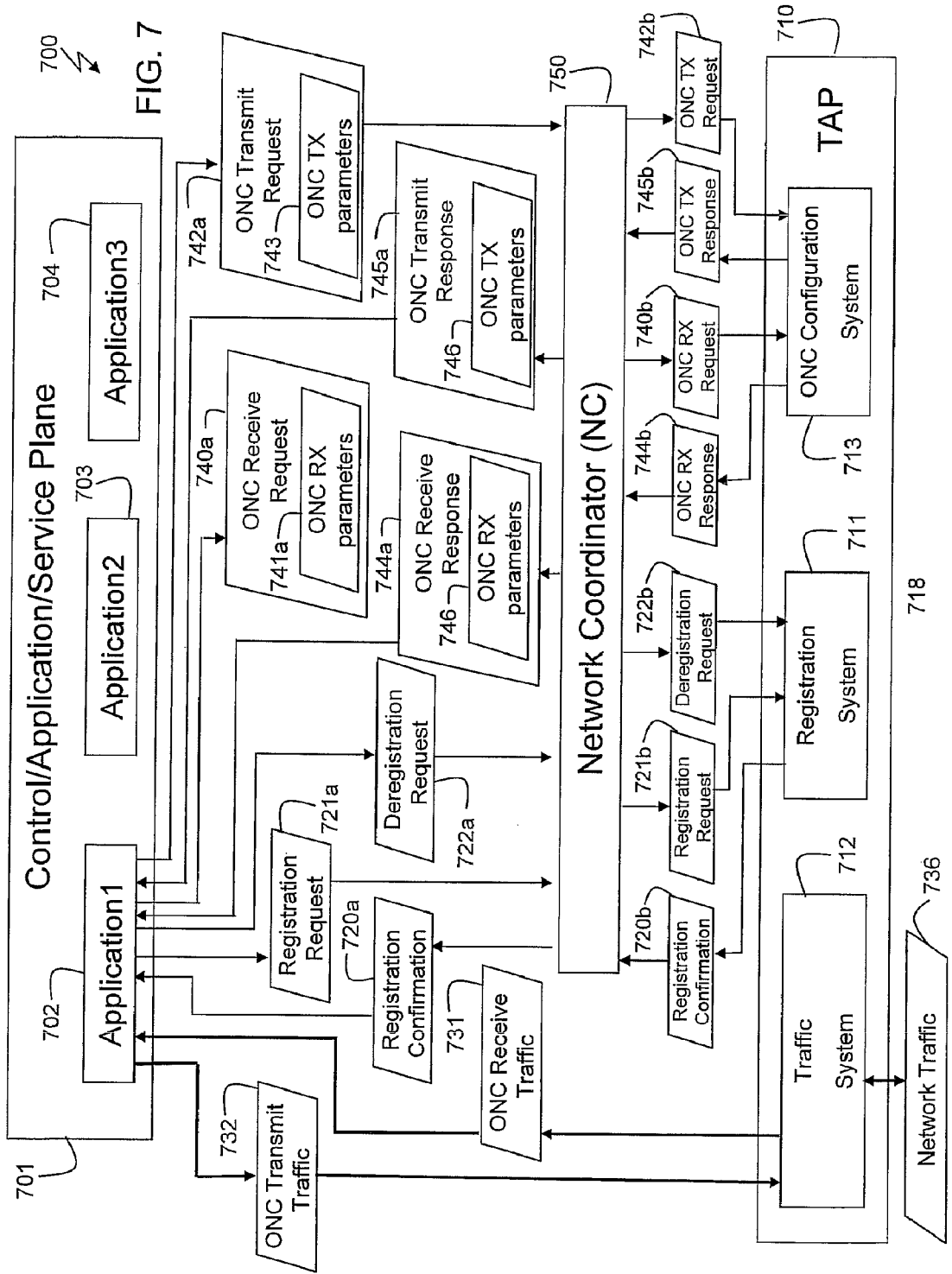

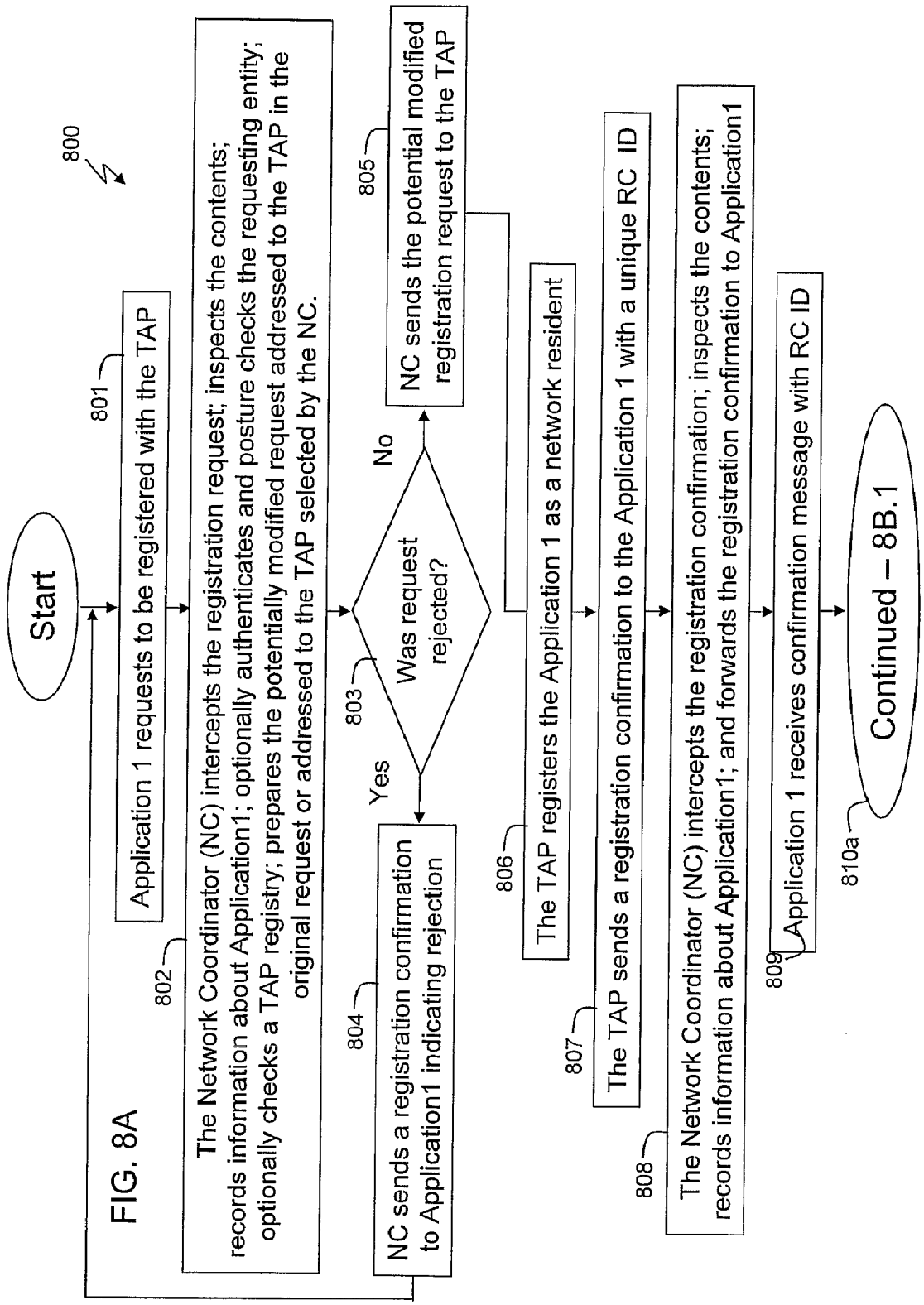

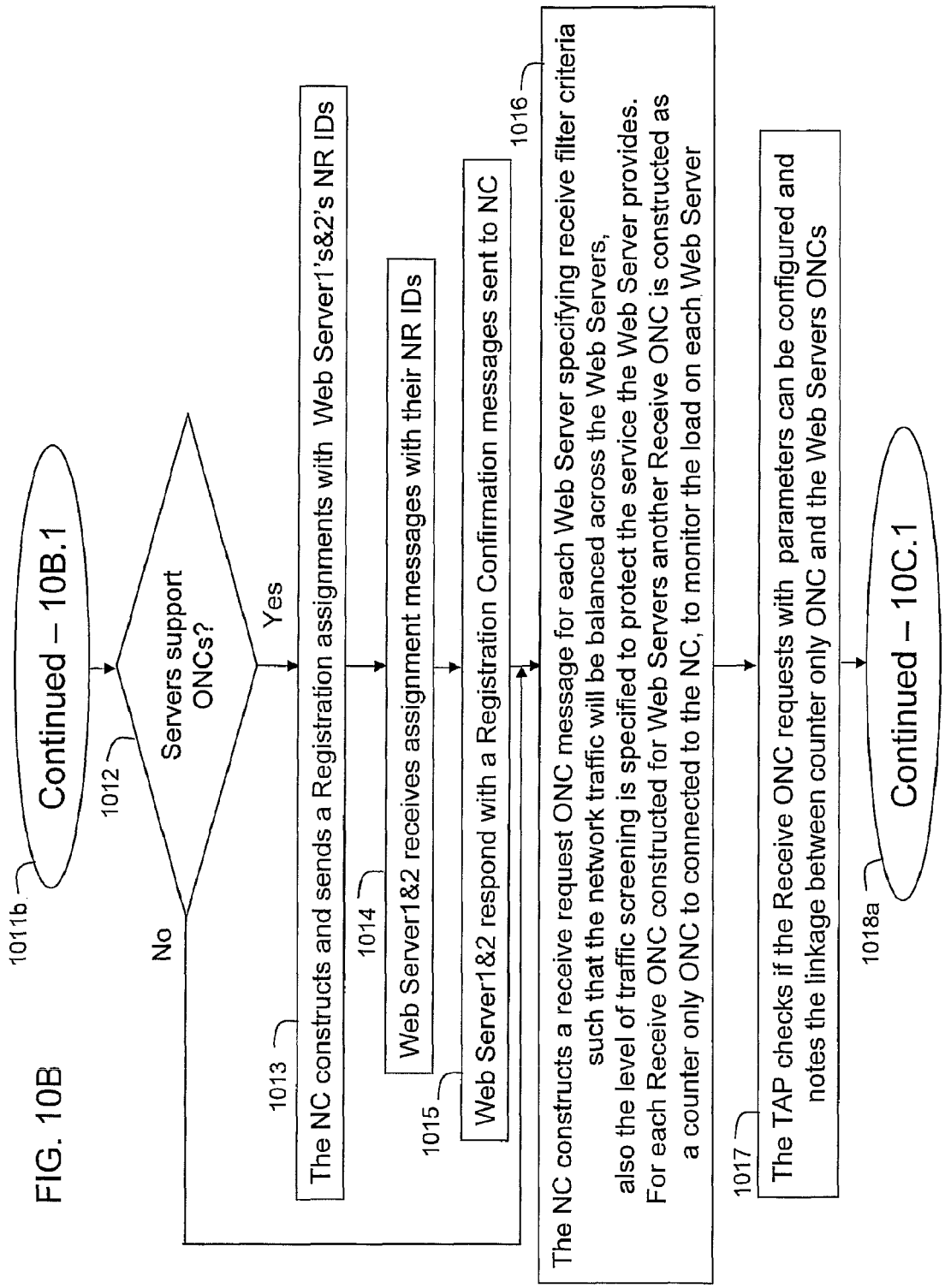

OPEN NETWORK CONNECTIONS

CLAIM FOR PRIORITY

This application is a divisional application of U.S. patent application Ser. No. 12/120,377, filed on May 14, 2008, now U.S. Pat. No. 8,085,662 the disclosure of which is hereby incorporated by reference in its entirety.

CROSS REFERENCE TO RELATED APPLICATIONS

This application is related to the following U.S. patent applications, all of which are incorporated by reference herein: U.S. patent applicaton Ser. No. 11/121,192, filed on May 3, 2005, entitled, "Packet diversion"; U.S. patent applicaton Ser. No. 11/443,490, filed on May 30, 2006, entitled "Intrusion Prevention System Edge Controller"; U.S. patent applicaton Ser. No. 11/636,340, filed on Dec. 8, 2006, entitled "Bi-Planar Network Architecture."

BACKGROUND

Ethernet, the predominant Local Area Network (LAN) technology, had early implementations constructed using a common shared coaxial cable with physical taps. Each tap connected an end node. This provided one shared network segment with no controls, with all of the end nodes being exposed to all of the traffic on the shared 10 megabits of transmit bandwidth. The next step in the evolution of Ethernet LANs introduced structured wiring, using multi-port interconnection devices that created hub and spoke topologies where each end node had a link (a spoke) connected to the multi-port interconnection devices (the hub). The hub provided the added control and the spokes provided private communication paths. The multi-port interconnection devices were first implemented as layer 1 interconnection (repeaters) devices, then later with layer 2 (bridges) devices. The multi-port interconnection devices were in turn interconnected to form a set of interconnected hubs that formed the physical LAN topology. This implementation provided a more controlled environment, limited the end node exposure traffic, and provided private communication paths between the multi-port interconnection devices and the end nodes.

Local Area Networks were organized in physically separate segments and these segments where interconnected by layer 3 devices (routers). These segments are called subnets in the Internet Protocol (IP) as specified by the Internet Engineering Task Force (IETF). Virtual Local Area Networks (VLANs), as specified by the IEEE 802.1D specification, were introduced as a mechanism to separate the logical topology (subnets) from the physical topology (LAN segments). VLANs provided a new topology control method that enabled assignments of end nodes or traffic types to logical topologies and traffic priorities independent of the physical location within the LANs. These assignments where controlled by network management policies and provided the first separation from the physical deployment to the assignment of logical (virtual) LAN segments (VLANs).

Network Access Control (NAC) was then added, which controlled the VLAN or VLANs an end node was allowed to access. One example of an NAC method was specified by the IEEE in the 802.1x specification. The NAC would: authenticate the end node to verify the identity of the end node; optionally do a posture check of the end node to verify the end node software presented no threat; and based on that information would assign the end node to one or more VLANs or deny access to the network. NAC implementations usually contain security authentication information and the associated policy indicating what parts of a network and/or what resources an end node is allowed to access. The policy information is stored on a NAC policy server and this information is utilized by an enforcement point, which acts as a network sentinel to control end node access at the edge of the network.

VLAN assignment controls an end node's network connection to one or more VLANs, but the end node is still restricted to its physical connection point to the network; the traffic filtering, to select the packets needed from passing network traffic, must be done by the end node; the traffic sent to and sent by the end node is not scrutinized to remove security threats without deploying expensive Intrusion Prevention Systems at the edge of the network in line with each end node.

SUMMARY

The above-referenced patent application entitled, "Bi-Planar Network Architecture," discloses electronic communications networks including a connectivity plane for performing network connectivity functions, and a control plane for performing one or more of network access control, attack control, and application control. A control plane as well as network connected applications and services may interconnect and interact with a connectivity plane and with each other through a variety of interfaces.

The above-referenced patent application entitled, "Network Traffic Redirection in Bi-Planar Networks" discloses techniques for providing interfaces between a connectivity plane and a control/application plane in an electronic communication network. In particular, the control/application plane entity is registered with the connectivity plane, and the connectivity plane redirects network traffic from the connectivity plane to the registered application control plane entity. For example an electronic communication network includes a connectivity subsystem. A control or application subsystem is registered with the connectivity subsystem. The control subsystem requests that traffic be redirected from the connectivity subsystem to the control subsystem. In response to the redirection request, the connectivity subsystem redirects network traffic to the control subsystem. Information about the connectivity subsystem, the control subsystem, and the redirection request may be stored in a record such as a management information base. The connectivity subsystem and control subsystem may communicate with each other using a protocol, such as SNMP or a protocol layered on top of SNMP.

Embodiments of the present invention are directed to techniques for alleviating the physical network connection point restriction by providing one or more logical network connection points. The logical network connections are provided via an interface between one or more connectivity plane devices and a network connected application, service, or control plane function, in an electronic communication network. The network connected application, service, or control plane function registers itself as a logical network resident (NR) with the function in the connectivity plane that will provide the logical open network connection (ONC). This function in the connectivity plane is called the traffic access provider (TAP).

In addition to the features disclosed by the above mentioned previous patent applications, embodiments of the present invention add the following features:

Parameters of the point-to-point connection between the
network connection point Traffic Access Provider (TAP)

and the network resident (NR). The parameters, collectively referred to as the connection transmission descriptor, control aspects of the point-to-point connection provided by the ONC such as:
  Addressing, VLAN, encapsulation, encryption
  Full packet, partial packet, or counter only
  Best effort, guaranteed deliver, traffic priority
  Level of traffic scrutiny for security purposes
  Traffic logging
A transmit ONC.
A third party entity called a network coordinator (NC) that assists in establishing one or more open network connections (ONCs) or assigns one or more open network connections (ONCs)to the logical network resident (NR).
Application examples using ONCs such as:
  Network monitoring application using ONCs
  Server Load Balancer using ONCs
  NAC implementation using ONCs
  Wireless Mobility using ONCs
  Service Provider network topology using ONCs For example, in one embodiment of the present invention, a system is provided for controlling Local Area Network (LAN) traffic. The system includes a traffic access provider; a network resident comprising managed connection requesting logic to send a managed network connection request over the LAN, the request including a specification of a network traffic filter; and connection establishment logic to establish a managed network connection between the network resident and the traffic access provider in response to the request. The traffic access provider includes traffic reception circuitry to receive network traffic over the LAN; filter determination logic to determine whether the network traffic satisfies the specified network traffic filter; traffic modification logic to modify the network traffic to produce modified network traffic if the network traffic satisfies the specified network traffic filter; and traffic sending logic to send the modified network traffic to the network resident over the LAN on the established connection if the network traffic satisfies the specified network traffic filter.

The request may further include a specification of a particular level of network traffic security screening; wherein the traffic access provider further comprises security screening logic to determine whether the network traffic satisfies the particular level of network traffic security screening; and wherein the traffic sending logic comprises logic to send the modified network traffic to the network resident over the LAN on the established connection only if the network traffic satisfies the particular level of network traffic security screening.

The traffic modification logic may include logic to modify the network traffic in accordance with a managed connection transmission descriptor associated with the managed network connection to produce the modified network traffic. The managed connection requesting logic may include logic to send the managed connection transmission descriptor within the request. The traffic access provider may further include logic to associate the managed connection transmission descriptor with the connection.

In another embodiment of the present invention, a system is provided for controlling Local Area Networking (LAN) traffic, including: a traffic access provider; and a network coordinator comprising logic to send a managed network connection request over the LAN to the traffic access provider, the request including a specification of a network traffic filter and an identifier of a network resident. The traffic access provider may include: connection establishment logic to establish a managed network connection between the network resident and the traffic access provider in response to the request; traffic reception circuitry to receive network traffic over the LAN; filter determination logic to determine whether the network traffic satisfies the specified network traffic filter; traffic modification logic to modify the network traffic to produce modified network traffic if the network traffic satisfied the specific network traffic filter; and traffic sending logic to send the modified network traffic to the network resident over the LAN on the established connection if the network traffic satisfies the specified network traffic filter.

In another embodiment of the present invention, a system is provided for controlling Local Area Networking (LAN) traffic, comprising: a traffic access provider; a network resident comprising managed connection requesting logic to send a managed network connection request over the LAN, the request including a traffic screening specification. The traffic access provider may include: connection establishment logic to establish a transmit-only managed network connection between the network resident and a traffic access provider in response to the request; a circuit to receive network traffic from the network resident over the managed network connection; traffic screening logic to determine whether the network traffic satisfies the traffic screening specification; and traffic sending logic to send the network traffic to the network if the network traffic satisfies the traffic screening specification.

In yet a further embodiment of the present invention, a method is provided for use with a Local Area Network including an end node having a local area network interface. The method includes: (A) registering the end node as a first network resident with a first traffic access provider, comprising assigning a first network resident identifier to the first network resident; (B) establishing a first managed network connection between the first network resident and the first traffic access provider over the Local Area Network; (C) while the first managed network connection is active, transmitting first managed traffic over the first managed connection from the first network resident to the first traffic access provider, wherein the first managed traffic includes the first network resident identifier; (D) at the first traffic access provider, modifying the first managed traffic to produce first modified traffic; (E) at the first traffic access provider, transmitting the first modified traffic to the LAN; and (F) while the first managed network connection is active, transmitting first unmanaged traffic from the end node to the LAN using the local area network interface, wherein the first unmanaged traffic does not include the first network resident identifier.

In yet another embodiment of the present invention, a method is provided for use with a Local Area Network including an end node having a local area network interface. The method includes: (A) registering the end node as a first network resident with a first traffic access provider, comprising assigning a first network resident identifier to the first network resident; (B) establishing a first managed network connection between the first network resident and the first traffic access provider over the Local Area Network; (C) at the first traffic access provider, while the first managed network connection is active: (1) receiving first network traffic over the LAN at the first traffic access provider; (2) determining whether the first network traffic satisfies a first network traffic filter associated with the first managed network connection; (3) if the first network traffic satisfies the first network traffic filter, then: (a) modifying the first managed traffic to produce first modified traffic including the first network resident identifier, and (b) transmitting the first modified traffic to the end node over the LAN on the first managed network connection; and (D) while the first managed network connection is active, transmitting first unmanaged traffic to the end node over the LAN using the local area network interface, wherein the first unmanaged traffic does not include the first network resident identifier.

In another embodiment of the present invention, a method is provided for use with a Local Area Network including an end node having a local area network interface, the method comprising: (A) at a network coordinator, sending a managed network connection request over the LAN to a traffic access provider; (B) at the traffic access provider, establishing a managed network connection between the traffic access provider and the network coordinator over the Local Area Network; (C) transmitting first unmanaged network traffic from the end node to the network coordinator using the local area network interface; (D) at the network coordinator: (1) receiving the first unmanaged network traffic; (2) modifying the first unmanaged network traffic to produce first managed network traffic including an identifier of the end node; and (3) transmitting the first managed network traffic over the first managed network connection to the first traffic access provider; (E) at the first traffic access provider, modifying the first managed traffic to produce first modified traffic; (F) at the first traffic access provider, transmitting the first modified traffic to the LAN; and (G) while the first managed network connection is active, transmitting second unmanaged traffic from the end node to the LAN using the local area network interface, wherein the second unmanaged traffic does not identify the end node.

In a further embodiment of the present invention, a method is provided for use with a Local Area Network including an end node having a local area network interface. The method includes: (A) at a network coordinator, sending a managed network connection request over the LAN to a traffic access provider; (B) at the traffic access provider, establishing a managed network connection between the traffic access provider and the network coordinator over the Local Area Network; (C) at the traffic access provider: (1) receiving first unmanaged network traffic over the LAN; (2) modifying the first unmanaged network traffic to produce first managed network traffic including an identifier of the end node; and (3) transmitting the first managed network traffic to the network coordinator over the managed network connection; (D) at the network coordinator: (1) receiving the first network traffic; (2) modifying the first managed network traffic to produce second managed network traffic which does not include an identifier of the end node; and (3) transmitting the second unmanaged network traffic to the end node over the LAN.

In another embodiment of the present invention, a system is provided for controlling access to a Local Area Network (LAN). The system includes: a traffic access provider; a network coordinator comprising: registration request logic to send a request over the LAN to register a network resident with the traffic access provider; managed connection request logic to send a managed network connection request over the LAN, the request including a specification of a network traffic filter; and network access logic to determine whether a first end node is authorized to access the LAN. The traffic access provider includes: registration logic to register the network resident with the traffic access provider; connection establishment logic to establish the managed network connection between the network resident and the traffic access provider; traffic reception circuitry to receive network traffic over the LAN; filter determination logic to determine whether the network traffic satisfies the specified network traffic filter; and traffic sending logic to send the network traffic to the network resident over the managed network connection if the network traffic satisfies the specific network traffic filter. The network coordinator further comprises receive traffic forwarding logic to forward the network traffic to the first end node if the end node was determined to be authorized to access the LAN.

In a further embodiment of the present invention, a system is provided for monitoring network traffic in a Local Area Network (LAN). The system includes: a first traffic access provider; a network resident comprising: network monitoring logic; first managed connection requesting logic to send a first request over the LAN for a first counter-only managed network connection, the first request including a first specification of a first network traffic filter. The first traffic access provider comprises: first connection establishment logic to establish the first counter-only managed network connection between the network monitoring logic and the first traffic access provider in response to the first request; first traffic reception circuitry to receive first network traffic over the LAN; first traffic count sending logic to send, to the network monitoring logic over the first counter-only managed network connection, a first indication of a first amount of the first network traffic that satisfies the first specified network traffic filter.

In yet another embodiment of the present invention, a system is provided for balancing network traffic load in a Local Area Network (LAN). The system includes: a first network resident; a second network resident; a traffic access provider; a network coordinator; first connection establishment logic to establish a first managed network connection between the first network resident and the traffic access provider, wherein the first managed network connection is associated with a first network traffic filter; second connection establishment logic to establish a second managed network connection between the second network resident and the traffic access provider, wherein the second managed network connection is associated with a second network traffic filter; third connection establishment logic to establish a first counter-only managed network connection between the network coordinator and the traffic access provider, wherein the first counter-only connection is associated with the first network traffic filter; fourth connection establishment logic to establish a second counter-only managed network connection between the network coordinator and the traffic access provider, wherein the second counter-only connection is associated with the second network traffic filter. The first traffic access provider comprises: traffic reception circuitry to receive network traffic over the LAN; first filter logic to determine whether the network traffic satisfies the first network traffic filter and, if the network traffic satisfies the first network traffic filter, to: increase a first counter associated with the first network traffic filter; send an indication of the first counter to the network coordinator over the first counter-only connection; and send the network traffic to the first network resident over the first managed network connection; and second filter logic to determine whether the network traffic satisfies the second network traffic filter and, if the network traffic satisfies the second network traffic filter, to: increase a second counter associated with the second network traffic filter; send an indication of the first counter to the network coordinator over the first counter-only connection; and send the network traffic to the second network resident over the second managed network connection.

In another embodiment of the present invention, a system is provided for wirelessly connecting a wireless end node having a first IP address to a Local Area Network (LAN). The system includes: a first traffic access provider in a first subnet of the LAN; a second traffic access provider in a second subnet of the LAN; a mobility function comprising: network resident registration logic to register the wireless end node as a network resident with the first traffic access provider; and first managed connection requesting logic to send a first managed network connection request over the LAN, the first request including a specification of a network traffic filter. The first traffic access provider comprises: first connection establishment logic to establish the first requested managed network connection between the first traffic access provider and the network resident; traffic reception circuitry to receive network traffic over the LAN; filter determination logic to determine whether the network traffic satisfies the specified network traffic filter; and traffic sending logic to send the network traffic to the network resident on the established connection if the network traffic satisfies the specified network traffic filter. The mobility function further comprises: second managed connection requesting logic to send a second managed network connection request over the LAN in response to a change of IP address of the end node to a second IP address. The second traffic access provider comprises: second connection establishment logic to establish the second requested managed network connection between the second traffic access provider and the network resident.

Other features and advantages of various aspects and embodiments of the present invention will become apparent from the following description and from the claims.

BRIEF DESCRIPTION OF THE DRAWINGS

FIG. 4 is a diagram of an electronic communication network according to one embodiment of the present invention;
FIG. 6 this diagram depicts ONCs setup between an end node and a TAP; between an end node and a TAP with the NC as an intermediary; and ONCs between a TAP and an end node assigned by a NC;
FIG. 7 is a diagram of an electronic communication network according to one embodiment of the present invention with the Network Coordinator(NC)function;
FIG. 8A-8E are flow charts of a method for resgistration of an application with a TAP and configuring receive and transmit ONCs, with the NC as an intermediary, in the electronic communication network of FIG. 7 according to one embodiment of the present invention;
FIG. 10A-10D are flow charts of a method for resgistration of an application with a TAP and assigning receive and transmit ONCs to the NR, with the NC as an intermediary, in the electronic communication network of FIG. 9 according to one embodiment of the present invention.

DETAILED DESCRIPTION

Due to various limitations of the prior art, there is a need to further separate the physical network and the logical connection points of end node, in order to provide more control over the end node connections and ease the deployment and implementation of network connected application and service implementations by providing new types of network connections and off loading the traffic selection and traffic security scrutiny tasks.

Today implementers of network connected applications or services need to understand, build, and test network specific functions to interface with the network along with the tasks needed to implement the application functions or provide the services. Embodiment of the open network connection (ONC) disclosed herein not only provide the decoupling of physical network connection from the logical connection, they also provide a simpler interface that hides the implementation details of the various network specific operations. Embodiments of open network connections disclosed herein provide a unique capability: open network connections that are controlled, scrutinized, and cleaned; leaving the heavy lifting of the filtering and scrubbing network functions to an open network adapter, and decoupling the end node's physical connection point to the logical connection point provided by open network connections.

Figure 1:
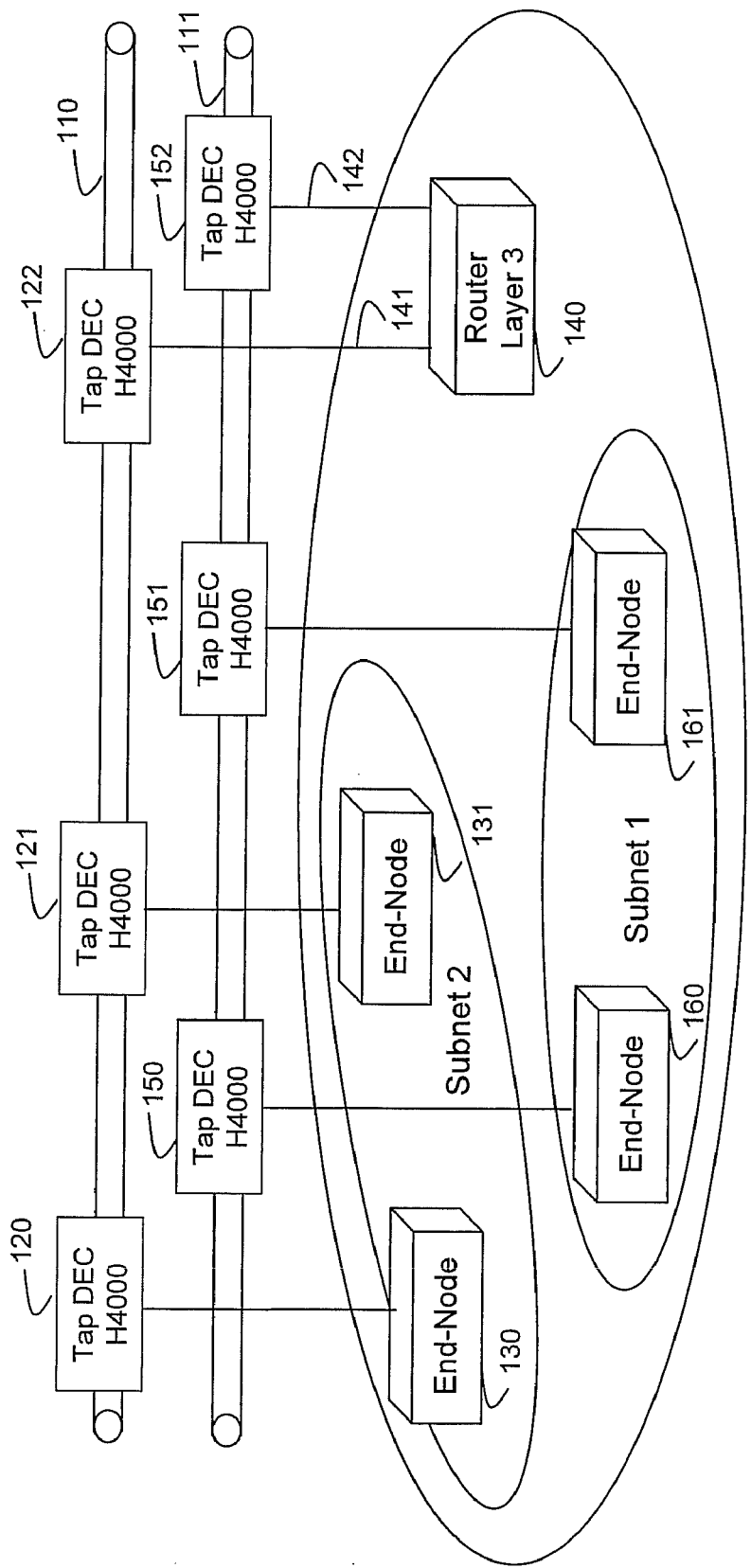
FIG. 1 Original Ethernet Physical Topology.

Referring to FIG. 1, an early Ethernet LAN implementation constructed using two coaxial cables 110 & 111 is shown. Each coaxial cable is shared with all the attached physical taps 120-122 on cable 110 and physical taps 150-152 on cable 111. Only a small number of attachments are shown to simplify the diagram but most old implementations had many attachments with a specified maximum of 1024 attachments. Each tap connects an end node or router interface. Physical taps 120-122 connect end nodes 130 & 131 and the subnet 2 link 141 of router 140 respectively. Physical taps 150-152 connect end nodes 130 & 131 and the subnet 1 link 142 of router 140 respectively. These network segments provide no controls and all the end nodes connected to a LAN segment share the 10 megabits of bandwidth traversing the coaxial cable. All end nodes connected to the cable are exposed to all traffic on that segment. The Router 140 controls the traffic between the two subnets, but within each subnet there are no traffic controls.

Figure 2:
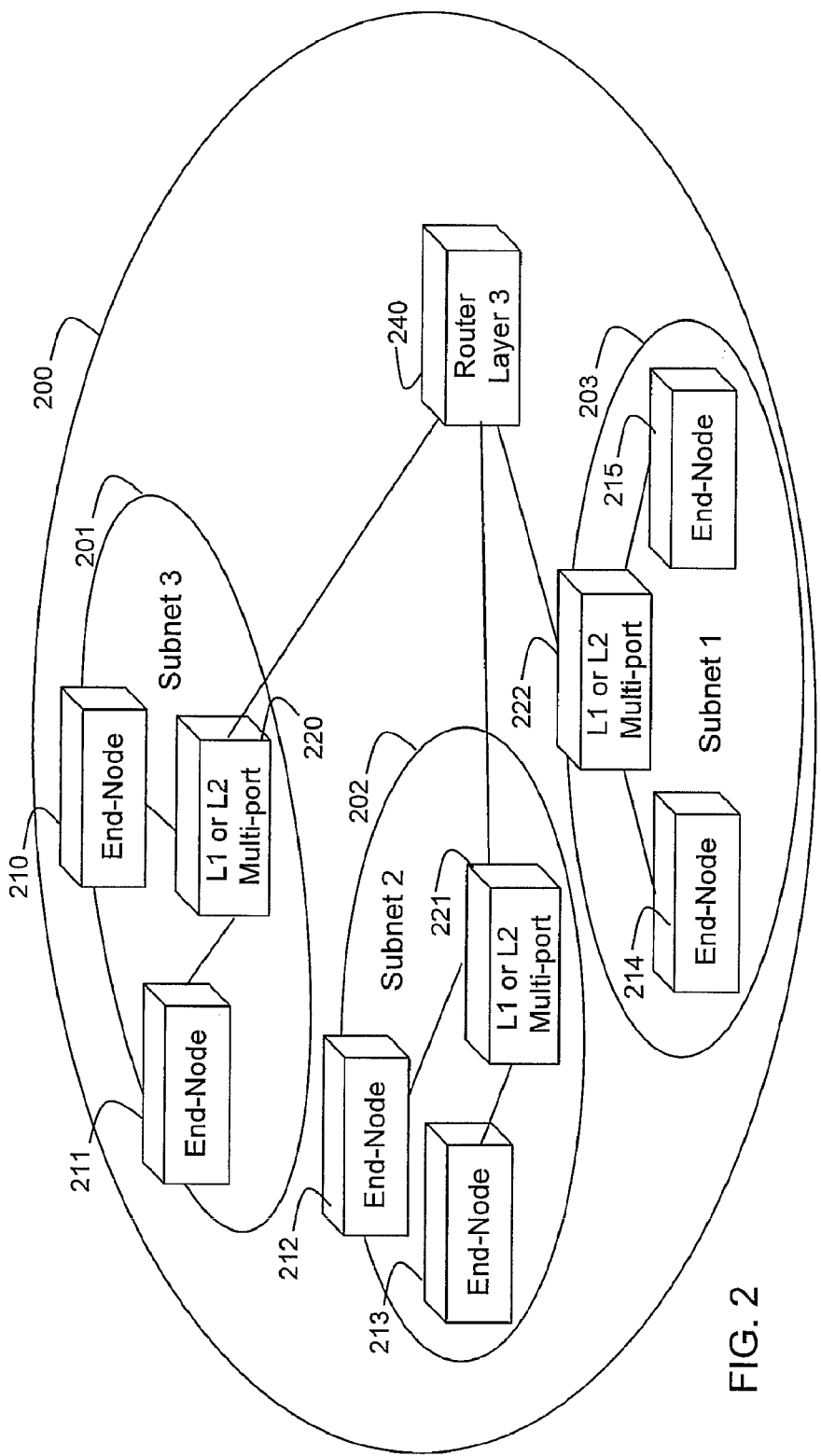
FIG. 2 Ethernet Structured Wiring Topology.

Referring to FIG. 2, the next step in the evolution of Ethernet LANs, the introduction of structured wiring, is shown. FIG. 2 depicts a LAN 200 divided into three LAN subsections 201-203. Each LAN subsection denotes an IP subnet. Multi-port interconnection devices 120-122 create hub and spoke topologies where each end node 210-215 has a link (spoke) connected to a multi-port interconnection device (hub). The multi-port interconnection devices where first implemented as a layer 1 interconnection (repeaters) devices, then later with layer 2 interconnection (bridges) devices. This implementation allowed controls to be added at each connection. The layer 2 device has more controls than the earlier layer 1 devices. The Local Area Networks were organized in physically separate subsections 201-203 and these subsections were interconnected by layer 3 devices (routers) 240. These LAN subsections are called subnets in the Internet Protocol (IP) as specified by the IETF.

Virtual Local Area Networks (VLANs) were introduced as a mechanism to separate the logical topology (subnets) from the physical topology (LAN subsections). VLANs provided a new topology control method that enabled assignments of end nodes or traffic types to logical topologies and traffic priorities independent of the physical location within the LANs. These assignments were controlled by network management policies and provided the first separation from the physical deployment to the assignment of logical (virtual) LAN subsections (VLANs).

Figure 3A:
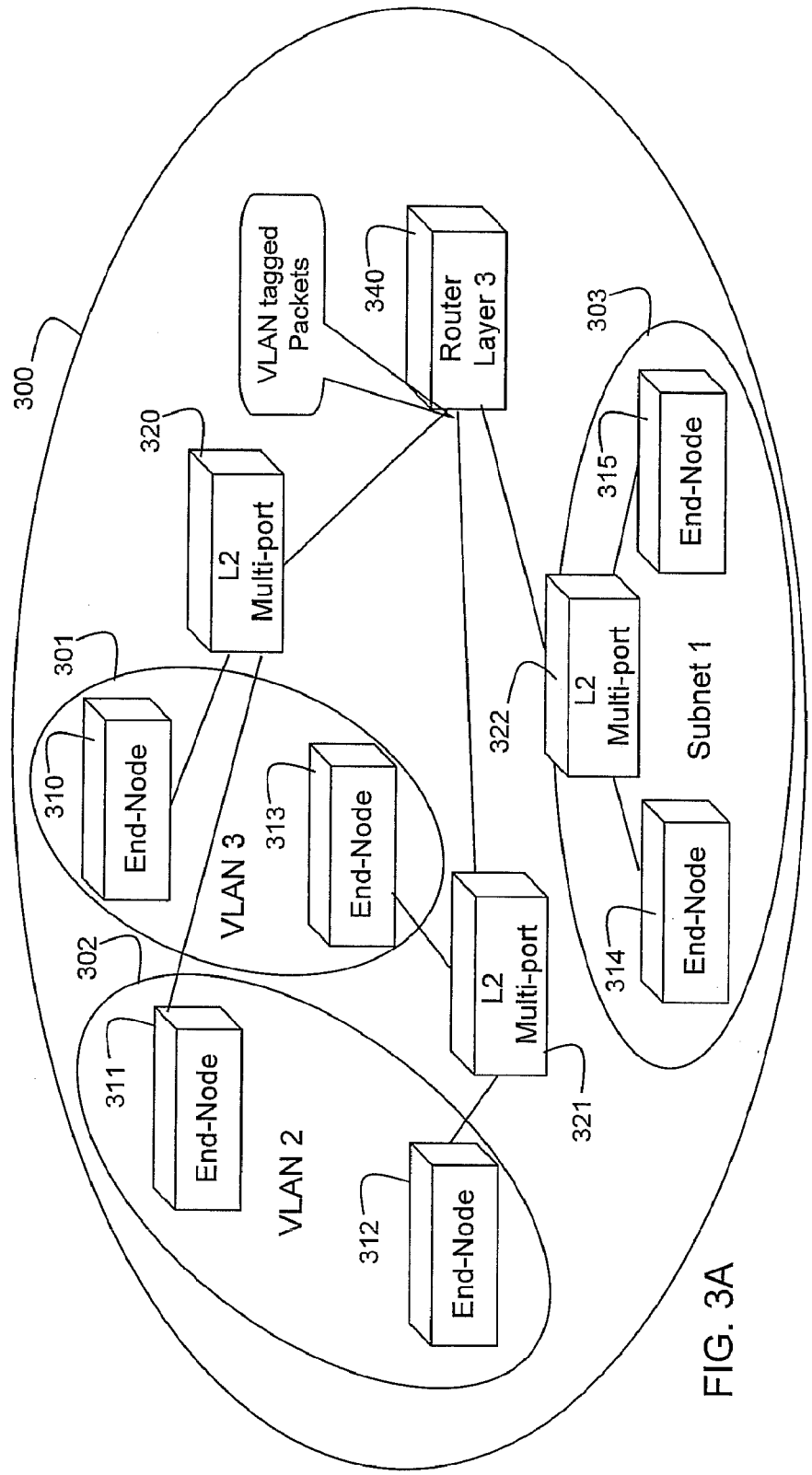
FIG. 3A Ethernet Structured Wiring Topology with VLANs.

Referring to FIG. 3A the LAN 300 is divided into two logical groupings VLAN2 302 and VLAN3 301 and one physical group Subnet 1 303. As you can see from FIG. 3A, end nodes 310-313 are not grouped by their physical location or what layer 2 switch to which they are connected. This logical topology can coexist with end nodes 314 & 315 which are grouped the old way by physical location. The three groups 301-303 are interconnected by router (layer 3 switch) 340. Since the groupings are not necessarily based on physical location, the router 340 can not distinguish traffic coming from one group versus another by which physical link the traffic is received. Rather, the router 340 must use the VLAN tag, on the received packets, to determine which group sent the packet. Also the router 340 must tag the packets it sends to assure they are received by end nodes that are members of that VLAN. In summary, since physical separation can not be relied upon to identify the VLAN from which traffic was sent, traffic is tagged to identify the VLAN of the sender. End nodes know to which VLANs they are members and will ignore traffic with tags indicating a VLAN to which they are not a member.

Figure 3B:
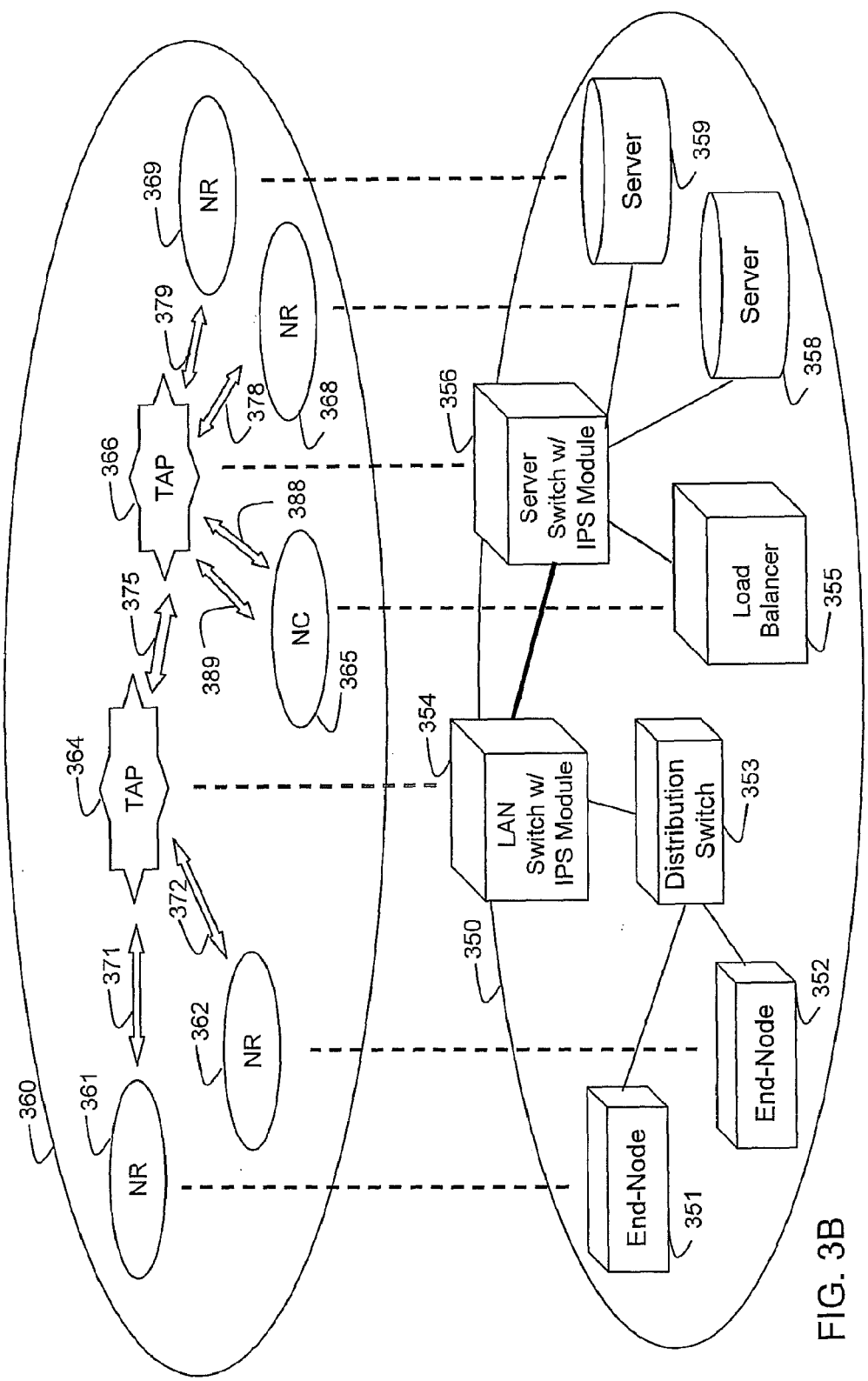
FIG. 3B Logical hub and spoke topology with ONC and TAPs.

Referring to FIG. 3B, a LAN 350 is shown containing a variety of physical network components interconnected in a particular physical topology. As will be described in more detail below, the LAN components include certain functionality which effectively creates a logical network 360 which has a topology that is independent of the topology of the physical network 350. More specifically, the LAN 350 contains end nodes 351 & 352, both of which are physically connected to a distribution switch 353. LAN Switch with an IPS module 354 contains hardware and software that implements the Traffic Access Provider (TAP) 364 functionality. The physical LAN 350 also contains two servers 358 & 359 which are physically connected to a Server Switch with an IPS module 356 which contains hardware and software that implements the TAP functionality 366.

The resultant logical topology 360 contains Network Resident (NR) 361, which corresponds to physical end node 351. Network Resident (NR) 361 is a logical entity that is created when end node 351 registers with TAP 364, which is a logical entity implemented in the LAN switch with IPS module 354. An Open Network Connection (ONC) 371 is established between NR 361 and TAP 364. Likewise NR 362 establishes an ONC 372 with TAP 364. The ONCs are shown as bi-directional but ONCs may be established as separate transmit and receive ONCs. A hub and spoke structure in the logical topology 360 is created by the ONCs 371 & 372 (spokes) and the TAP 364 (hub) which provides both a control point in the network and provides end nodes 351 & 352 with network connection points that are in different physical locations, in the network, than their physical connection points at the distribution switch 353. A well managed logical topology 360 is formed that can scrutinize and associate all traffic to its sender, as well as provide network connection points that are in different locations in the physical network topology.

Also in the logic topology 360 we find NRs 369 & 368 connected to TAP 366 by ONCs 379 & 378, respectively. In this case the ONCs 379 & 378 were established by the Network Coordinator (NC) 365 on behalf of NRs 369 & 368. Also NC 365 established ONCs 389 & 388 between TAP 366 and NC 365, where ONC 389 is a counter-only version of ONC 379 and ONC 388 is a counter-only version of ONC 378. Also, there is a TAP to TAP connection (TTC) 375 established between TAP 364 and TAP 366. More detail will be provided later on TAP to TAP connections (TTCs).

All of the traffic associated with the ONCs in the logical topology 360 is controlled traffic which is carried across LAN 350 where it may coexist with less controlled traffic. This allows for a smooth migration, from a network controlled using traditional techniques such as switch control parameters and in-line IPS devices, to a fully controlled logical topology where all the traffic is inspected and associated with registered network residents. This migration is enabled by a Network Coordinator (NC) function working with legacy packet processing and control resources.

A NC can establish the managed logical connection on behalf of end nodes or may inspect the ONC requests sent by the end nodes. This capability can be leveraged to:
- provide a network sentinel to control access to the network;
- provide managed logical connections for end nodes that do not support ONCs;
- balance network traffic load to two or more end nodes or servers;
- provide network presence in one or more physical locations in the network to an end node or server;
- provide a customer premise network access to a wide area network and/or to other customer premise networks over a wide area network;
- provide network application deployment, upgrade, availability, and reconfiguration;
- provide a human interface to the network;

The NC function maybe implemented in a:
- network edge device such as Ethernet switch, intelligent network jack, or wireless access point;
- load balance appliance;
- mobility appliance;
- customer premise edge device as provided by a network service provider;
- network application administration control console appliance;
- a network kiosk These various implementation scenarios will be discussed in more detail later.

Figure 3C:
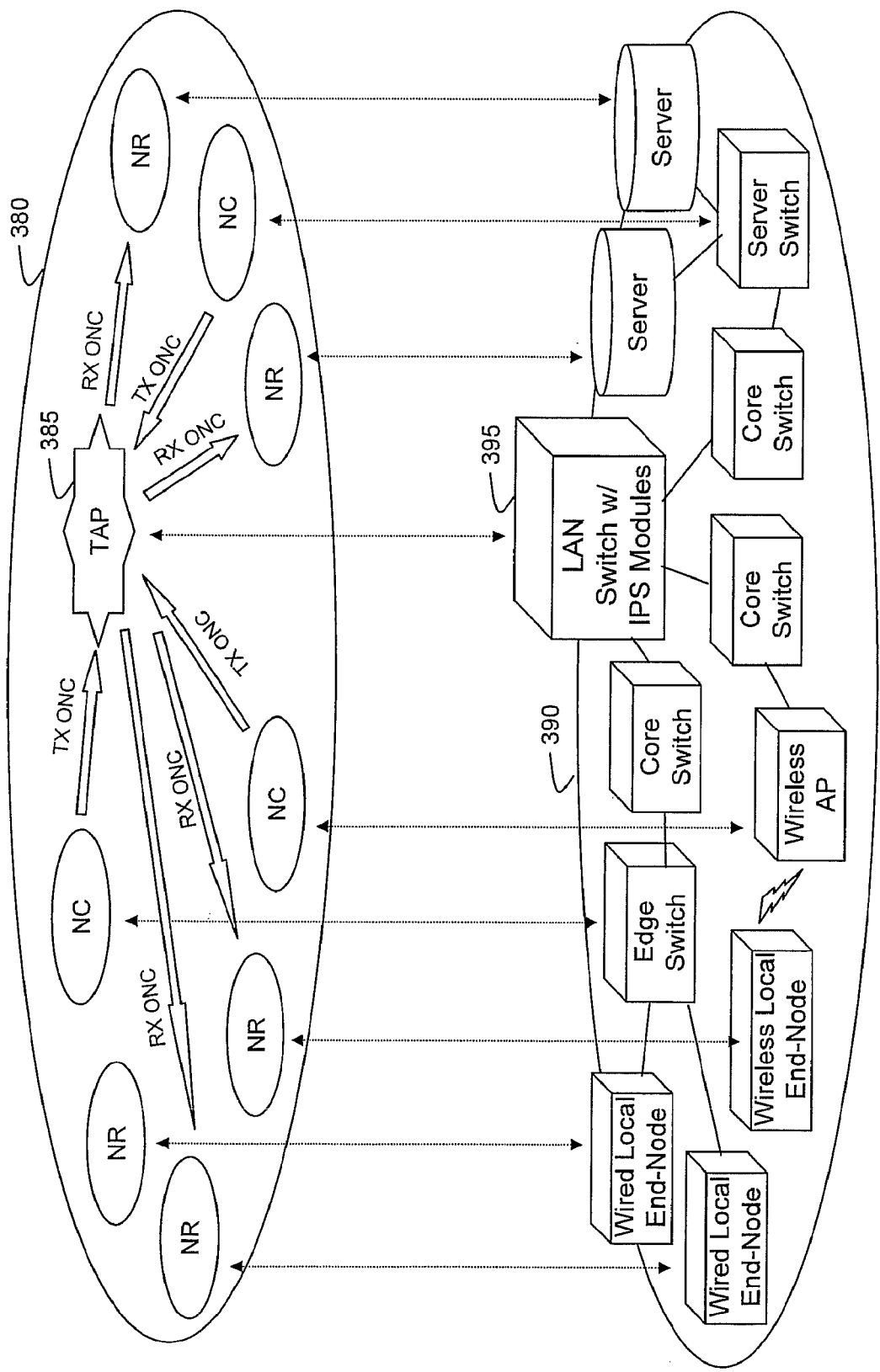
FIG. 3C Centralized TAP resources
FIG. 3D NAC use case when end node does not support ONCs
FIG. 3E NAC use case when end node does support ONCs
FIG. 3F Network Monitoring use case utilizing ONCs
FIG. 3G Load balancer use case utilizing ONCs
FIG. 3H Mobility use case utilizing ONCs

The traffic control and steering functions provided by the TAP, such as server load balancing and traffic security screening can be centralized; utilizing packet inspection and filtering hardware and software resources; lowering the implementation cost. This centralization is illustrated in FIG. 3C, where all the control resources are centralized in LAN Switch with IPS modules 395, in the physical LAN topology 390, by providing TAP functionality 385 in the logical controlled topology 380. This allows for large centralized traffic control implementations which ease the job of physical security, management, redundancy, and lower costs compared to existing implementations that deploy multiple IPS devices in line ("bump in the wire") configurations.

The use of ONCs for many different network functions not only provides the decoupling of physical network connection from the logical connection, it also provides for a smooth migration, from a network controlled using traditional disjoint set of techniques such as switch control parameters and in-line IPS devices, to a fully controlled logical topology where all the traffic is inspected and associated with registered network residents. To illustrate how a single flexible mechanism can accomplish a variety of network functions while migrating traffic to a uniform managed traffic which has a known registered source, a set of use cases are described that accomplish a variety of network functions using ONCs.

Network Access Control (NAC) was a step in the LAN evolution, which controlled the VLAN or VLANs an end node was allowed to access. The end node would be authenticated to verify the identity of the end node; optionally perform a posture check of the end node, to verify the end node software presented no threat; and based on that information would assign the end node to one or more VLANs or deny the end node access to the network. NAC implementations usually contain authentication information and the associated policy indicating what parts of a network and/or what network accessible resources an end node is allowed to access. The policy information is stored on a NAC policy server and this information is utilized by an enforcement point, which acts as a network sentinel to control end node access at the edge of the network. (See U.S. patent application Ser. No. 11/829,462, entitled "Dynamic Network Access Control Method and Apparatus," filed on Jul. 27, 2007.)

Figure 3D:
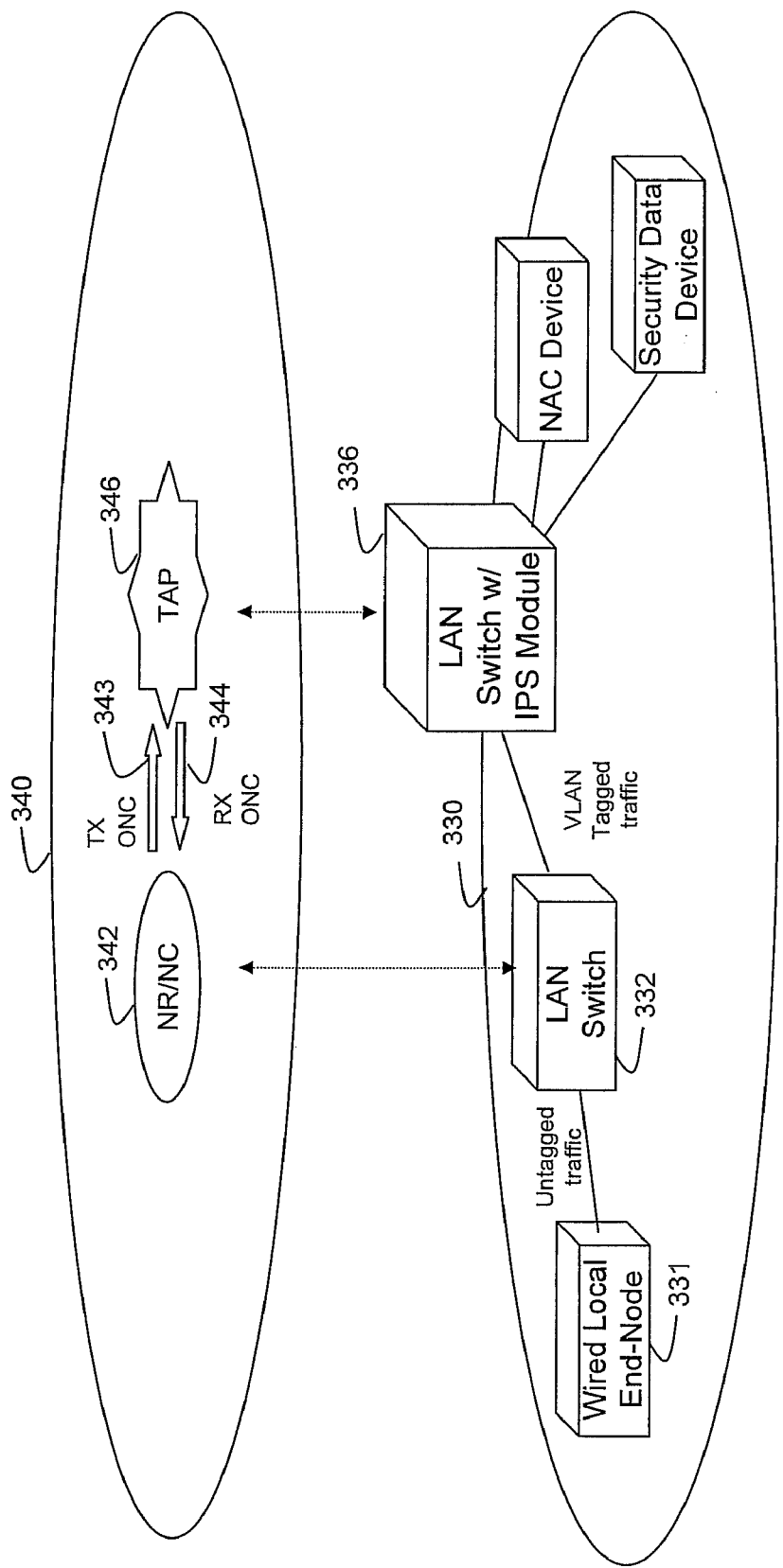
Figure 3E:
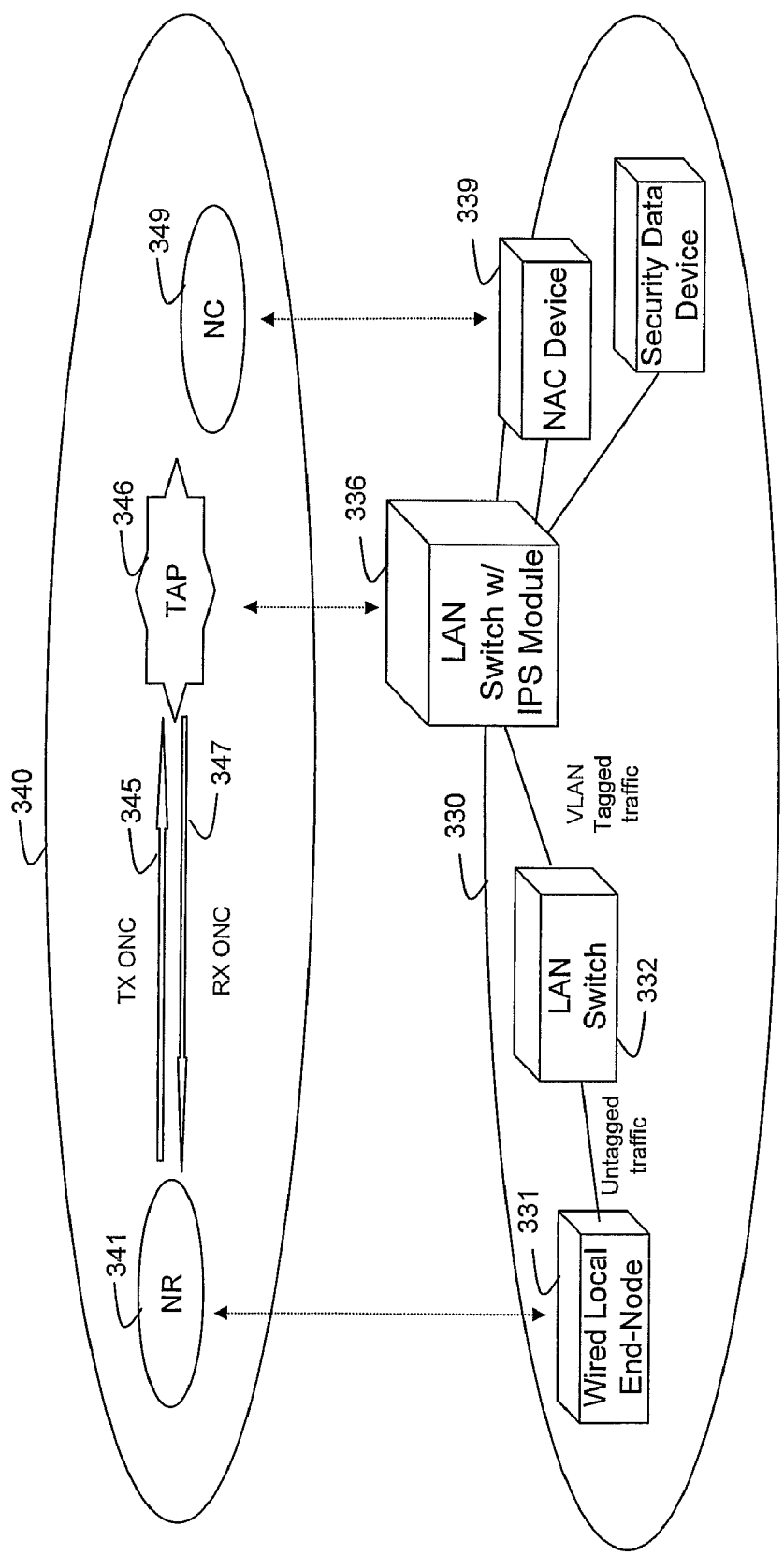

Referring to FIGS. 3D and 3E, two NAC use cases utilizing ONCs as its implementation technology are depicted. As with existing NAC implementations, there are a variety of scenarios that are encountered due to the variety of functions that may or may not be provided by the end nodes, enforcement points, and security policy servers. The end nodes may or may not support an authentication function, VLAN tagging, encryption, posture checking function, or ONCs. The enforcement point may be implemented by an edge Ethernet LAN switch, a wireless access point or switch, inline IPS, or other network attached device and may or may not provide an authentication protocol, security data base access method, VLAN tagging, encryption, posture checking function, or ONCs. The security data and access protocols and policies implementations can vary.

Implementing ONCs in a NAC implementation allows the network administrator and designer a method to organization and manage network access, after the end node has been cleared to access the network and the network accessible resources. If the end nodes do not implement ONCs a NC can set up the ONCs on behalf of the end nodes.

Now referring to FIG. 3D, a NC 342 can be implemented in the enforcement point, such as a LAN switch 332 in this example or the security server in another example not shown. The enforcement point 332, being in the path between the end node 331 and the network, can set up transmit 343 and receive 344 ONCs between the TAP 346 and the NC 342 (itself), in behalf of the end node 331 and without knowledge of the end node, aligned with the capabilities of the NC such as VLAN tagging, encryption, and encapsulation. The ONCs would be set up using the configuration parameters of the ONC requests. Once the ONCs are established, traffic would flow from the end node 331 to the LAN switch 332 which implements a NC 342 function and then to the TAP 346 implemented in the LAN Switch with IPS Module 336 using one or more of the established ONCs 343.

In the receive direction traffic would flow from the TAP 346 implemented in the LAN Switch with IPS Module 336 to the NC 342 implemented in the LAN switch 332 using or more the established ONCs 344 and then from the NC 342 implemented in the LAN switch 332 to end node 331. The NC 342 would register itself as the Network Resident (NR) on behalf of the end node 331. The NC 342 could disclose to the TAP 346, on a per ONC basis, what end node will be utilizing the ONC. This allows for all ONC traffic to be associated with an end node even if the end node does support ONCs directly.

Now referring to FIG. 3E, a NC 349 can be implemented by the NAC server 339 and establish transmit 345 and receive 347 ONCs on behalf the end node 331, after the end node has been granted network access. If the end node 331 supports ONCs the NC 339 can assign transmit 345 and receive 347 ONCs to the end nodes. Otherwise, the NC 349 could set up transmit 345 and receive 347 ONCs that used VLANs or no encapsulation, without knowledge of the end node. The NC 349 could configure the edge switch 332 to add and strip VLAN tags or read and utilize the existing VLAN configuration of the edge switch 332, that aligned with the configuration parameters of the transmit 345 and receive 347 ONCs. If the end node 332 supports ONCs it will register as a NR 341. Otherwise, the NC 349 could disclose to the TAP 346, on a per ONC basis, what end node will be utilizing the ONC.

Having established transmit 345 and receive 347 ONCs for all authorized traffic, the management and identification of unmanaged/unauthorized traffic is simplified. Also, the traffic screening can be centralized, managed, and expanded according to changing business needs. This provides more awareness of the network usage, from a planning, logging, control, billing perspectives. Also, the Class of Service (CoS) can be assigned and managed, since ONCs are authorized they can be assigned, accounted for, and budgeted, while all non-authorized (non-ONC) could be bandwidth and CoS limited.

Figure 3F:
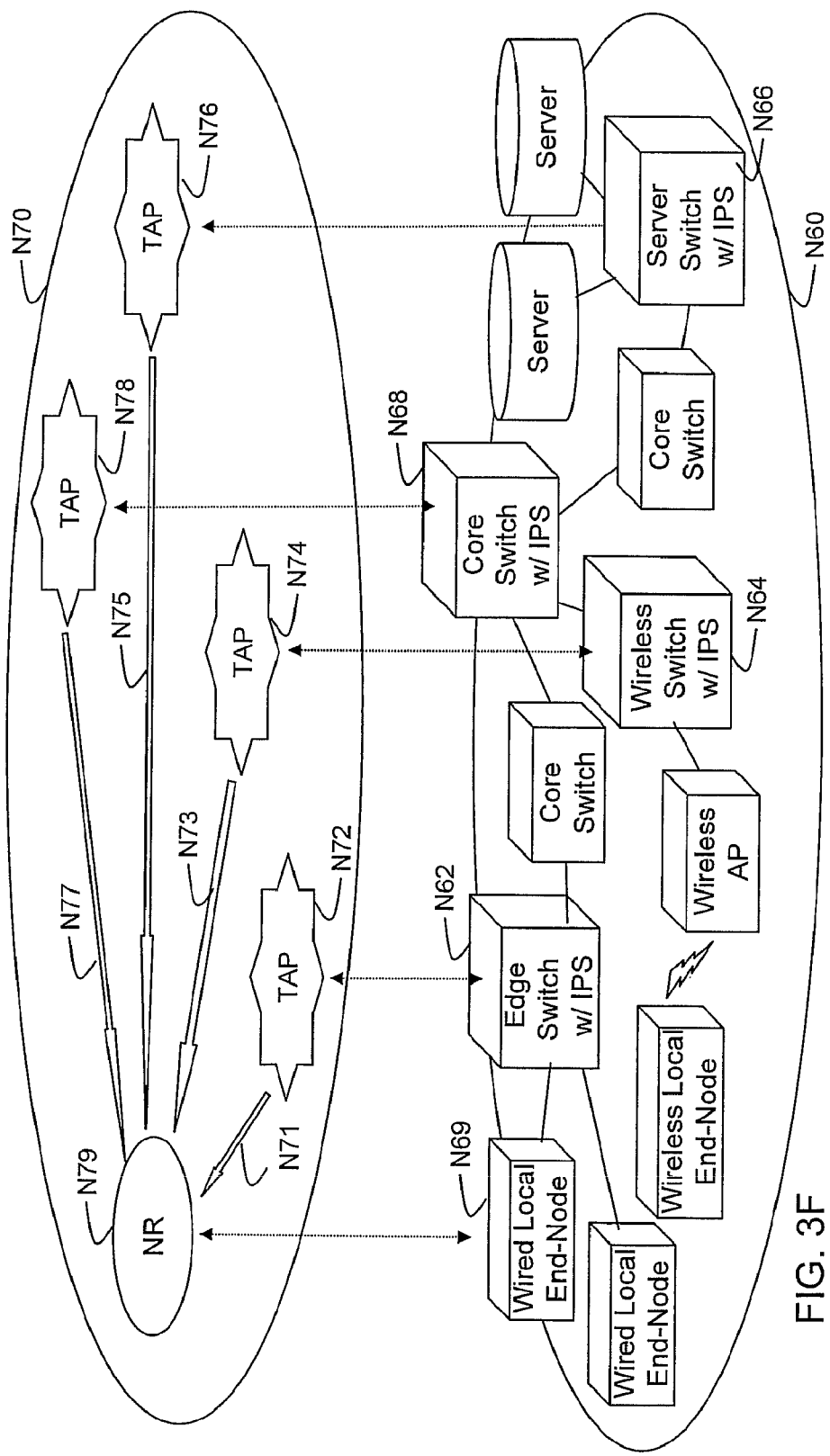

Referring to FIG. 3F a network monitor use case is depicted where a network monitoring application is running on end node N69. The application registers with the TAP N72 as a Network Resident (NR) N79. The TAP function N72 is running on the edge switch with IPS capability N62. The NR N79 requests a counter-only ONC N71 from TAP N72. This allows the application to monitor traffic having specific characteristics which are defined in the filter parameters associated with the ONC request. As a result of the request a counter-only receive ONC N71 is established between the TAP N72 running on edge switch N62 to the NR N79 which is a network monitoring application running on end node N69. Multiple ONCs may be requested and established with different filter criteria between NR N79 and TAP N72. When multiple counter-only ONCs are established between a NR and a TAP, the resultant counters can be packaged together to increase the network efficiency by lowering network load needed to transfer the counters to the NR. How the information is packaged is implementation specific but would contain the NR identification, the ONC identification, and counter update information.

The network monitoring application may also register with other TAPs in the network to gain other points of network traffic visibility. The NR resident ID can be shared with the TAPs in the network or each TAP could administer its own NR identification numbers. Once a NR is assigned an NR identification, it can use that identification when it registers with other TAPs. The TAP, upon receiving a registration request with a NR identification supplied, can check with the network wide NR identification database to see if this NR ID is authorized, and will accept the NR registration request if the ID has been authorized. Also a NR can request from a TAP, information about other TAPs in the network. The NR can use that information to make other connections with the other TAPs in the network. As shown in FIG. 3F, NR 79 established counter-only receive ONCs N73, N75, and N77 with TAPs N74, N76, and N78 respectively using the single NR identification.

If the network monitoring application wants more detailed traffic data, a counter-only ONC can be changed or a new ONC can be established to send the whole packets or portions of the packets to NR N79 for further inspection or display. This request for more detailed information may be in response to counters, received in the counter-only ONCs, indicating a possible network event that needs further analysis. A resultant logical topology is shown as N70 includes the NR N79, the TAPs N72, N74, N76, N78, and the established ONCs N71, N73, N75, N77. This logical topology N70 utilizes the physical topology N60 to carry the traffic. An advantage of using a common method to implement the variety of network related tasks, like this network monitoring task and the other uses cases disclosed in this application, is a resultant common logical topology. Network management and control tasks are simplified by migrating the network traffic and traffic control methods to use this common ONC based logical topology.

Figure 3G:
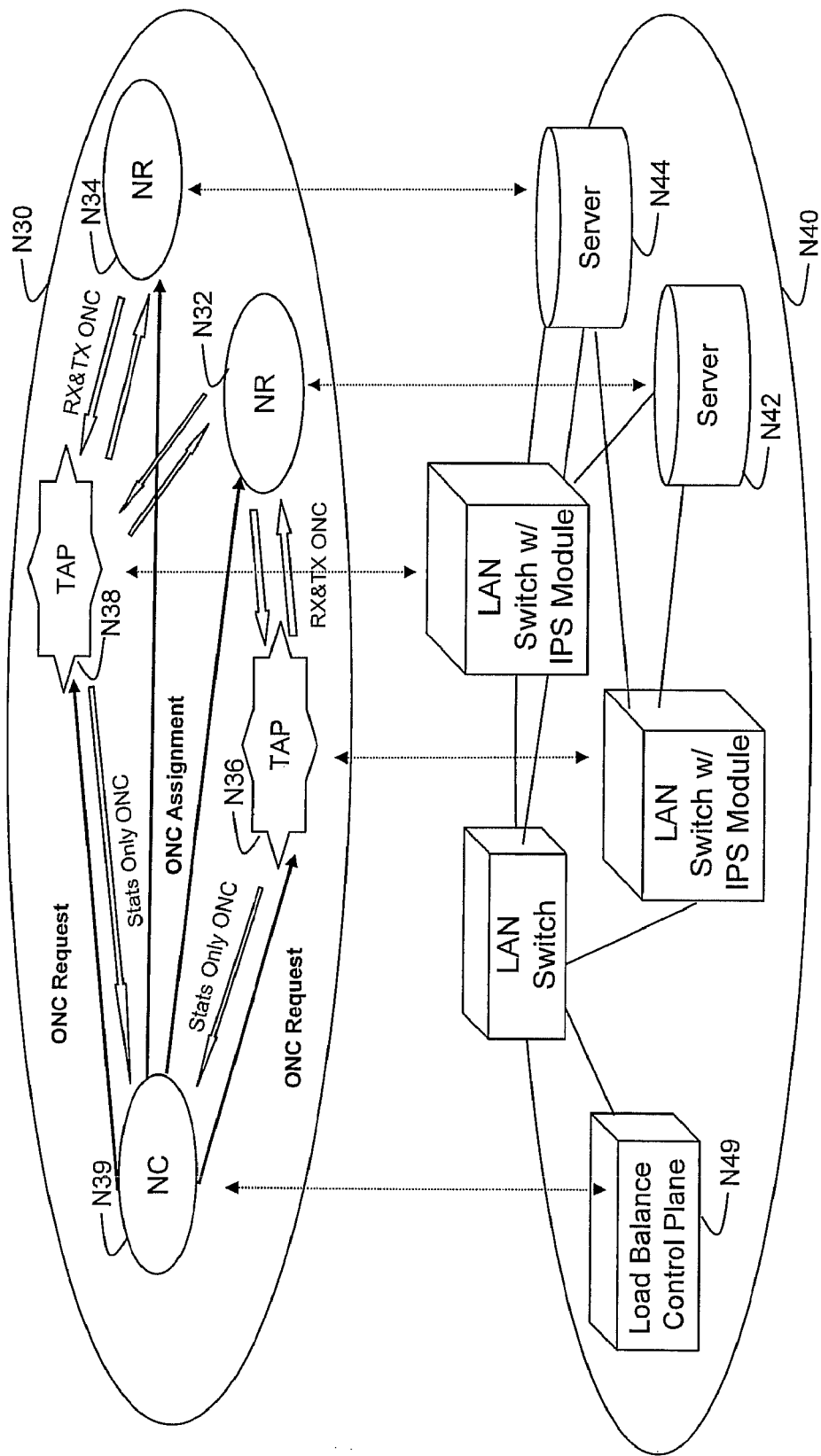

Referring to FIG. 3G a network load balancer use case is depicted where a network load balancing control plane application is running on end node N49. This load balancing application is responsible for controlling the network traffic load assigned to each of the servers N42 and N44. The load balancing application acts as a Network Coordinator (NC) N39 by configuring ONCs for the servers N42 and N44. If the servers do not support ONCs, the NC N39 can register the servers as Network Residents (NRs) N32 and N34 in behalf of the servers N42 and N44; else the servers each will request to be registered with the TAP. Servers N42 and N44 are registered as Network Residents (NRs) N32 and N34 respectively in the example depicted in FIG. 3G.

The load balancing application controls the traffic load to the server by establishing receive ONCs between the TAP N38 and the servers N42 and N44 as Network Residents N32 and N34. The load is distributed in accordance with the traffic filters specified in the ONC request. The load balancing application N49 configures an initial set of load balancing filters and monitors the load distribution by establishing counter-only version of the ONCs with the same filter parameters as the servers. This enables the load balancing application to monitor the actual load sent to the servers. The load balancing application can then adjust the filter parameters to change the load balancing assignments.

By configuring the VLANs and/or network addresses of the servers and the addressing parameters of the receive ONC, the traffic can be steered to the appropriate server without any additional configuration of software on the servers. The traffic will be identified and modified, with the needed addressing and or VLAN tagging, by the TAP and directed to the assigned server. The server will receive and process the traffic with out knowledge of the load balancing operations. If the servers support ONCs other types of traffic modification can be implemented by the TAP such as encryption for a more secure implementation.

FIG. 3G illustrates a redundant configuration with two TAPs N38 and N36. The load balancing application can figure the second TAP as an inactive back up or can configure the TAPs in a load sharing configuration. As with the single TAP implementation, the load balancing application request ONCs be established with specified filter criteria and counter-only ONC versions are also established for the load balancing application to monitor the traffic loads. The load balancing application can reconfigure the ONCs to provide high availability by redirecting traffic around failed or overloaded devices.

Security levels can also be enhanced and provided with higher efficiency with the ONC implementation. The ONC can be configured with traffic security screening that is tailored to the hardware and software of the server. Security filters are configured that protect the specific servers in use, resulting in no time is wasted looking for security risks that are designed for other hardware and software implementations and could not harm the servers in use. Also as with previous use cases, network management and control tasks are simplified by migrating the network traffic and traffic control methods to this common ONC based logic topology.

Figure 3H:
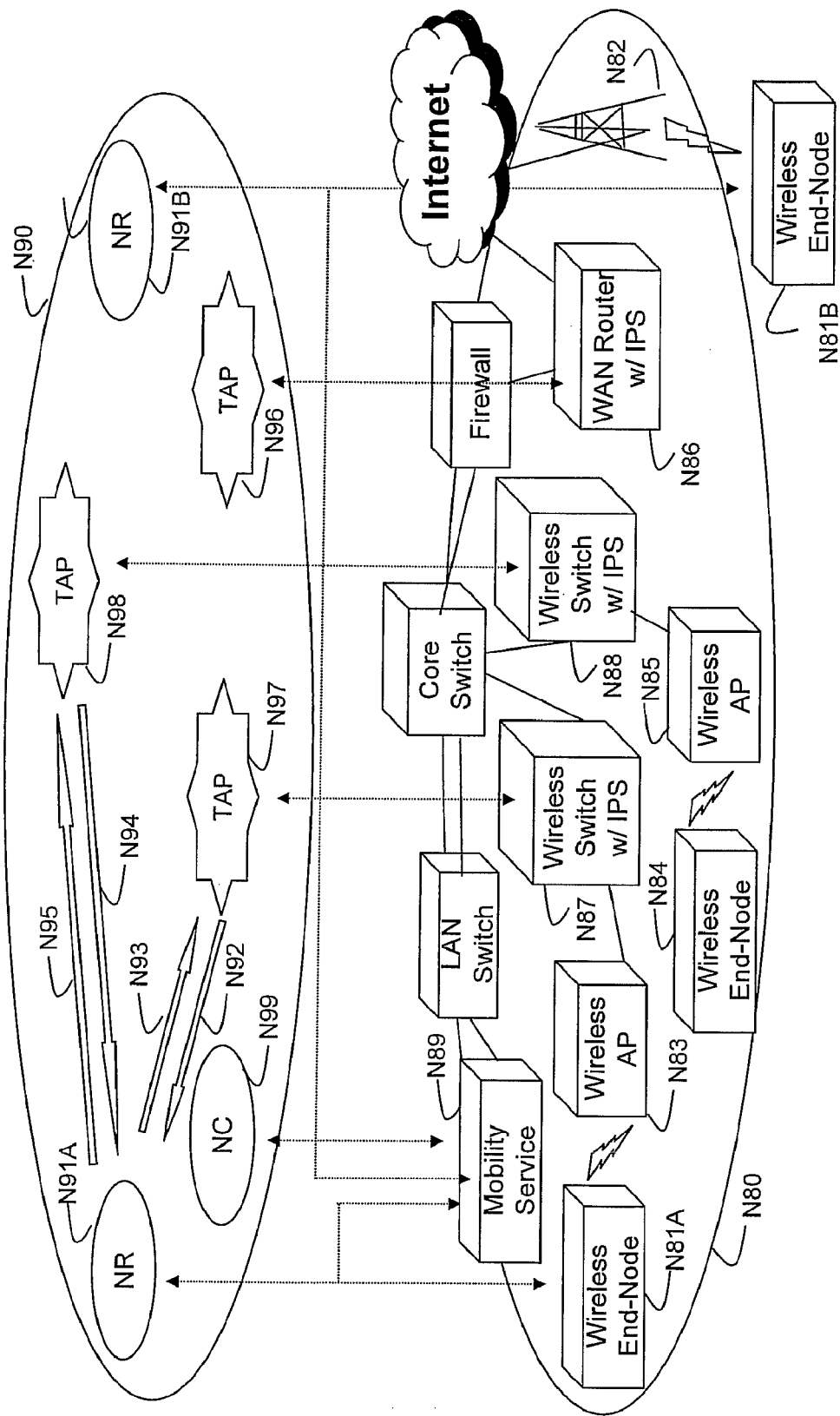

Referring to FIG. 3H a network mobility use case is depicted where a network mobility control plane application is running on a mobility service appliance N89. The mobility service aides the wireless end nodes with mobile network connectivity. The mobility service appliance works in conjunction with the wireless Access Points (APs) or wireless switches. The mobility service function may be implemented in the wireless switch instead of a separate appliance as shown in this example. The mobility service may also work in conjunction with a Network Access Control (NAC) function to authenticate and possibly do posture checking on the wireless end node before allowing any access to the network.

When a wireless end node, for example N81A, associates with wireless AP N83, the AP N83 or the wireless switch N87 notifies either the mobility service function or the NAC function of the newly connected wireless end node. If the mobility service appliance N89 is working in conjunction with a NAC function, the NAC function (not shown) will alert the mobility service appliance N89 when it has authorized the wireless node access to the LAN. The mobility service appliance N89, acting as a Network Coordinator N99, will use the network access information granted to the end node and register that wireless end node as Network Resident N91A with the TAP N97. TAP N97 is implemented in the wireless switch with IPS N87. If the wireless end node does not support ONCs, then the NC N99 will use its own assigned NR ID to set up ONCs in behalf of the wireless end node to provide mobile network connectivity for that wireless end node.

In this example the wireless end node N81A does not support ONCs, so the NC N99 acting as NR N91A establishes a receive ONC N92 that directs all traffic sent to the wireless end nodes' address, and other applicable multicast and broadcast packets, to the mobility service appliance N89. Also, the NC N99 acting as NR N91A establishes a transmit ONC N93 that allows the mobility service appliance N89 to relay all traffic sent to the wireless end node, but redirected with ONC N92, back to the wireless end node. This traffic redirection is not absolutely required until the wireless end node moves to a different subnet, so until the wireless end node moves to a different subnet, the TAP can be requested to connect a receive ONC directly to a transmit ONC.

The direct connection of receive ONC to a transmit ONC brings the traffic into the logical managed network topology which in turns provides the benefits of this logical topology such as control and scrutiny of traffic and the visibility and accountability crucial to network management. This construct, of directly connected RX and TX ONCs, provides a mechanism to migrate traffic from the diversely managed traffic of the physical plane N80 into the logical control plane topology N90 without the inefficiencies of traffic redirection. A RX ONC is directly connected to a TX ONC by specifying the TX ONCs in the ONC Receive Parameters section of the RX ONC request. The resultant "loopback" ONC combination has the net effect of providing the traffic security screening specified in the transmit ONC, traffic statistics, and the visibility and accountability of traffic in the logical control plane N90. These traffic statistics could be utilized by the NC N99 as a counter-only receive ONC (not shown) that tracks receive ONC N92 as an aide in providing mobile network connectivity.

After ONCs N92 and N93 have been established and directly connected, the wireless end node moves to a different subnet in the LAN within a customer premises or moves outside the customer premise and changes from a LAN wireless link to a WAN wireless, where this wireless WAN link is also in a different subnet. If the wireless end node re-associates with AP N85 which is in a different subnet, the wireless switch notifies the mobility service function. The mobility service function may again need to work with a NAC function to clear network access and to authenticate the wireless node. The mobility service function uses the information from the wireless switch or NAC function to identify that this wireless end node is the wireless end node N81A that was previously associated with AP N83. The mobility service takes action to provide the wireless end node N81A with connectivity using the previously assigned IP address in the subnet of AP N83.

First the mobility service registers with TAP N98 as NR N91A, assigned by TAP N97 to wireless end node N81A per request of NC N99 as described earlier. As in the previous example network monitoring use case, the NR ID may be coordinated across the TAPS in the network or each TAP may assign its own IDs to the requesting NR. If the TAP assigns it own IDs, the suggested ID provided in the request will be rejected and another ID will be assigned. The mobility service N89 then requests from TAP 98 a receive ONC to redirect all traffic, to or from the newly assigned network address of the wireless end node, in the new subnet associated with AP N85, to be sent to the mobility service over ONC N94. The mobility service requests a transmit ONC to enable the mobility service to transfer the traffic received from ONC N92, which was sent to the wireless end node's old network address, to wireless end node's new subnet, after modifying the traffic to be addressed to the wireless end node's new network address. Traffic sent from the wireless end node N81A, using the new network address as a source address, is received by the TAP N98 is re-directed via ONC N94 to the mobility service N89. The redirected traffic, which is associated with NR ID N91A, received by mobility service N89 and modifies the traffic to have the source address of the wireless end nodes' old network address, and sent on ONC N93 to TAP N97 in the wireless end node's old subnet.

This traffic redirection can be temporary to smooth the transition from one subnet to another. The mobility service N89 can decide, based on tracking active communication by the wireless end node or by configuration command, to stop the support of the old network address. If mobility service N89 decides to stop support, it will teardown the ONC N92 and N93 and probably configure a direct connect between ONC N94 and N95, eliminating the traffic redirection while maintain the wireless traffic in the logical control plane topology. Another mode of operation would be to have the wireless end node maintain the original network assigned address while its connected to the LAN.

If the wireless end node leaves the customer premise and connects to a wireless WAN connection, the mobility service N89 would need to get an alert indicating of its new WAN assigned network address of the wireless end node. This notification could come from the service provider of the wireless WAN connection or from the wireless end node. The mobility service N89 would then establish receive and transmit ONCs (not shown) with TAP N96 for traffic sent to and from the new WAN assigned network address. As with the previous example the mobility service N89 will redirect and modify traffic to the old subnet to smooth the transition the WAN assigned network address.

As with previous use cases, network management and control tasks are simplified by migrating the network traffic and traffic control methods to this common ONC based logic topology. And as shown by the directly connected receive and transmit ONCs, traffic can be migrated to logical control plane without the need for traffic redirection. The more tasks performed by the ONCs, the more traffic is migrated to the logical control plane, the more management tasks, such as control and scrutiny of traffic and the visibility and accountability crucial to network management, are simplified.

A service provider (WAN) topology using ONCs to connect the customers to the customer premise or public locations and utilize Interior Network Connections (INCs) for TAP to TAP connections. The INCs, like the ONCs can specify how and with what technologies use the connection, be established on a connection by connection basis.

Referring to FIG. 4, a diagram is shown of an electronic communication network 400 according to one embodiment of the present invention. The network 400 includes a data plane Traffic Access Provider (TAP) subsystem 410 and a control/application/service plane subsystem 401. The TAP subsystem 410 may, for example, could be implemented as one of a plurality of connectivity subsystems in a "connectivity/data plane," as that term is used in the above-referenced patents application entitled "Bi-Planar Network Architecture" and "Network Traffic Redirection in Bi-Planar Networks". For example, the TAP subsystem 410 may be implemented as a switch or a router. Similarly, the control/application/service subsystem 401 may, for example, be implemented as one of a plurality of control/application/service subsystems in a "control/application/service plane," as that term is used in the above-referenced patent application entitled, "Bi-Planar Network Architecture."

In general, an application of the control/application/service subsystem 401 requests that it be registered with the TAP subsystem 410. In response to the request, the TAP subsystem registers the application with the TAP subsystem 410 and assigns a Network Resident ID to the application. The application requests that a receive ONC be configured, according to the parameters sent with the registration request, that the specified network traffic be redirected to the control subsystem 150 using provided point to point connection parameters. More specifically, the TAP subsystem 410 includes means 411 for receiving a registration request 421 from the Application1 402, for registering the Application1 402 with the TAP subsystem 410 in response to the registration request 421, and for confirming the registration 420, means 413 for receiving a ONC Receive Request 440 from the Application1 402, means 412 for redirecting network traffic 436 to the Application1 402, via a point to point connection 431 in response to the Receive ONC request 440, and means 413 for confirming the Receive ONC request 442 with a ONC Receive Confirmation 444, means for redirecting network traffic 432, via a point to point connection, from Application1 402 to the network at the TAP subsystem 410, and on the network at the physical network attachment point of the TAP subsystem 436, in response to the Transmit ONC request 442, and means 413 for confirming the Transmit ONC request 442 with a ONC Transmit Confirmation 445.

Figure 5A:
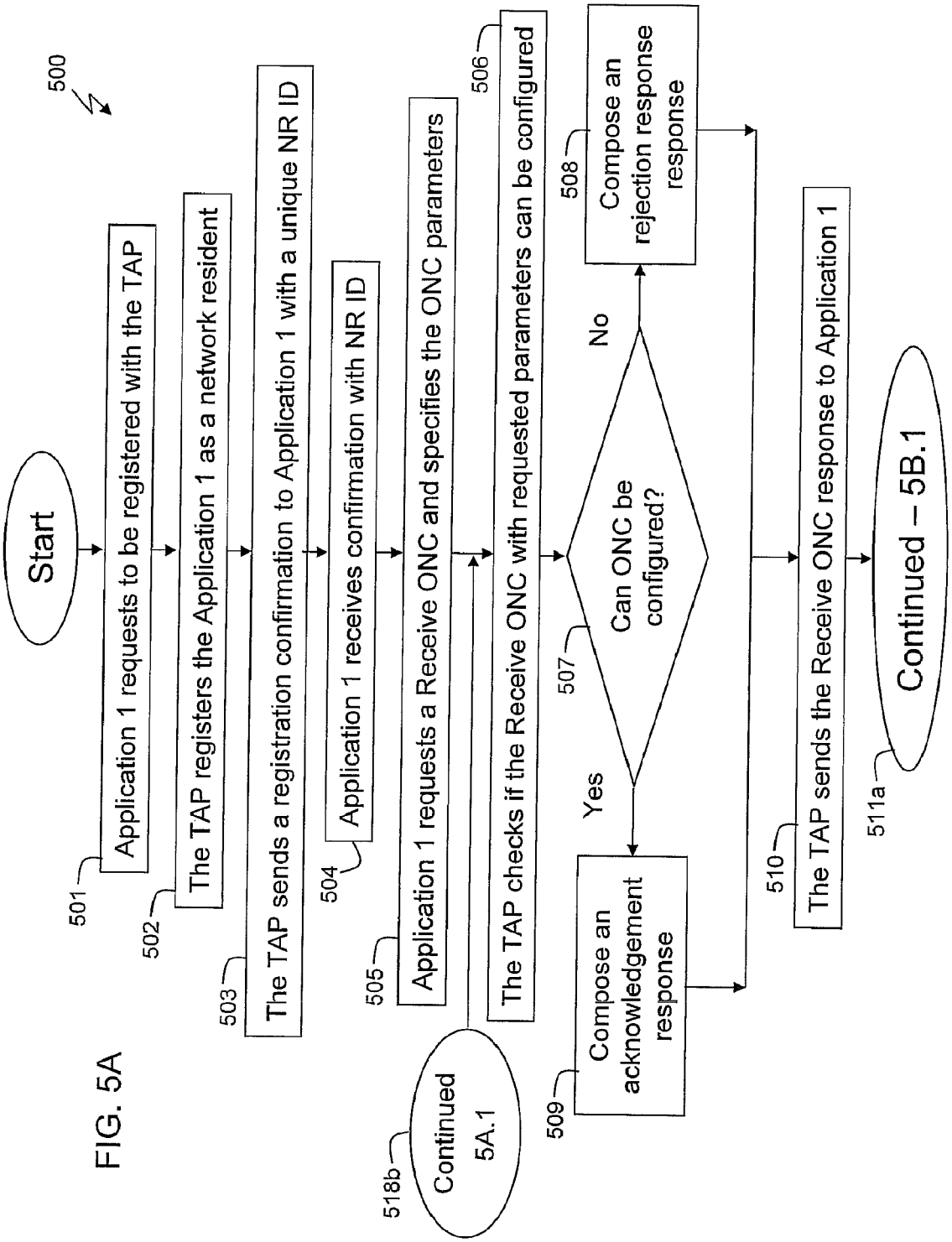
FIG. 5A-5C are flow charts of a method for resgistration of an application with a TAP and configuring receive and transmit ONCs in the electronic communication network of FIG. 4 according to one embodiment of the present invention.
Figure 5B:
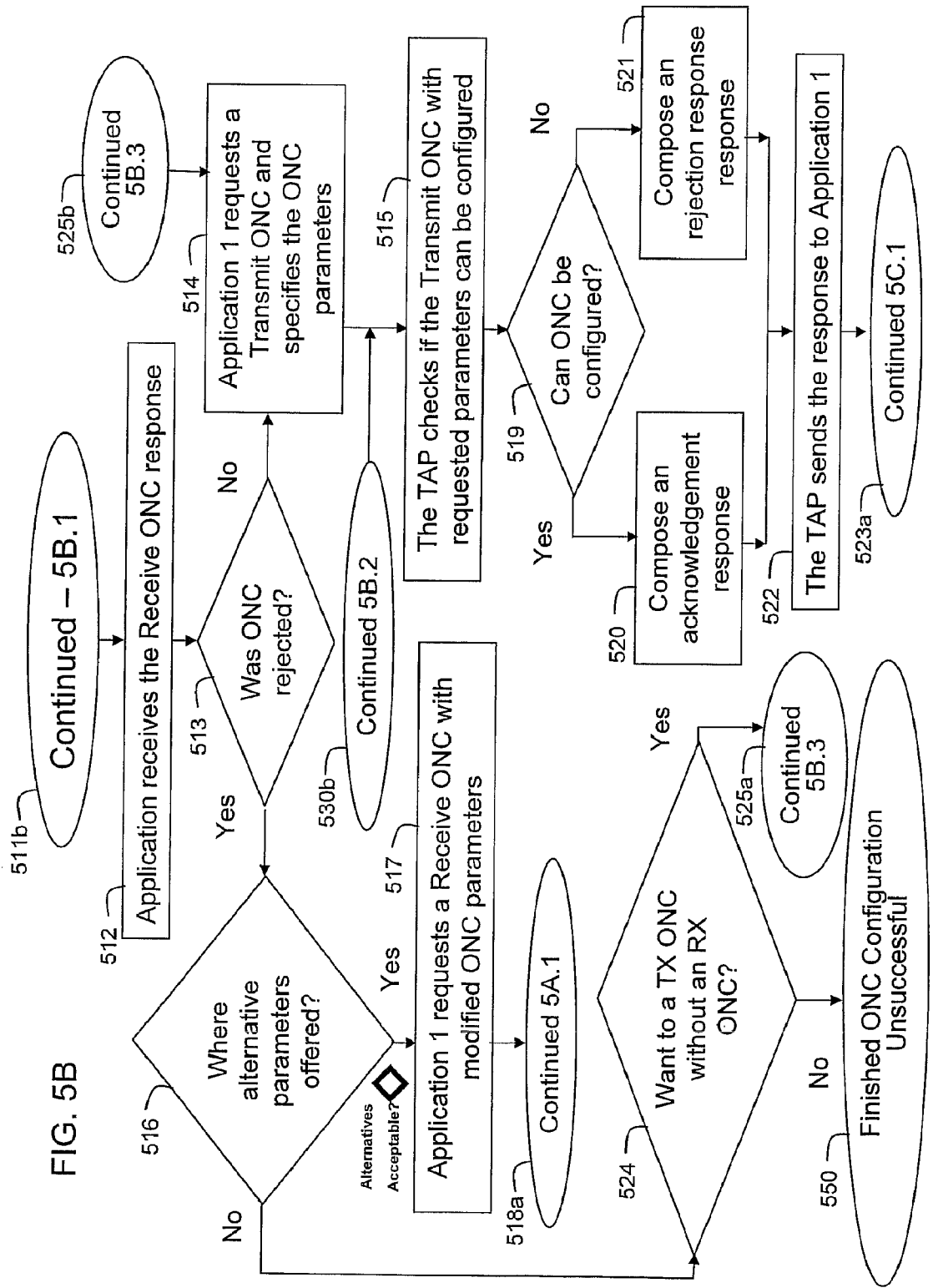
Figure 5C:
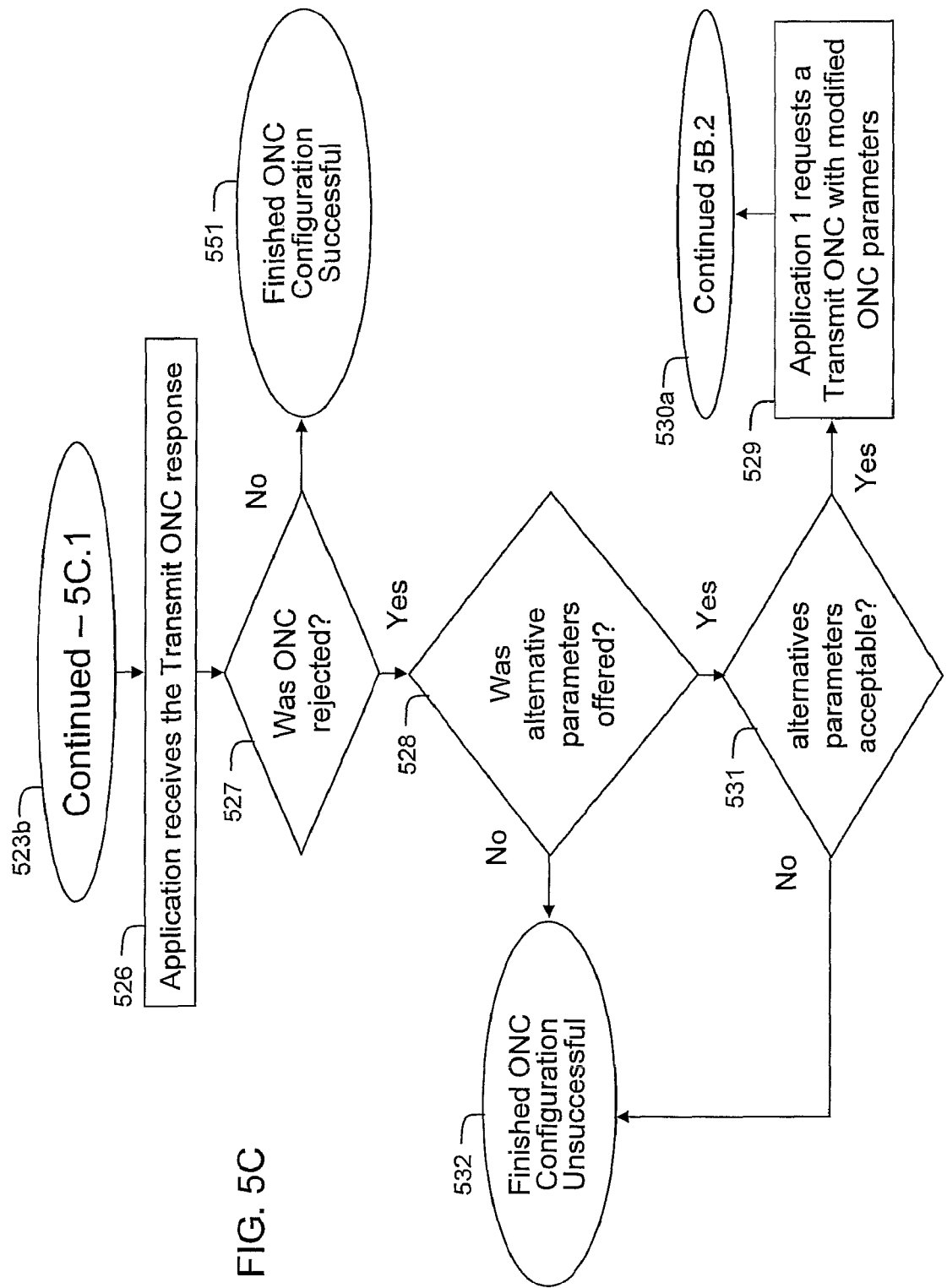
Figure 8B:
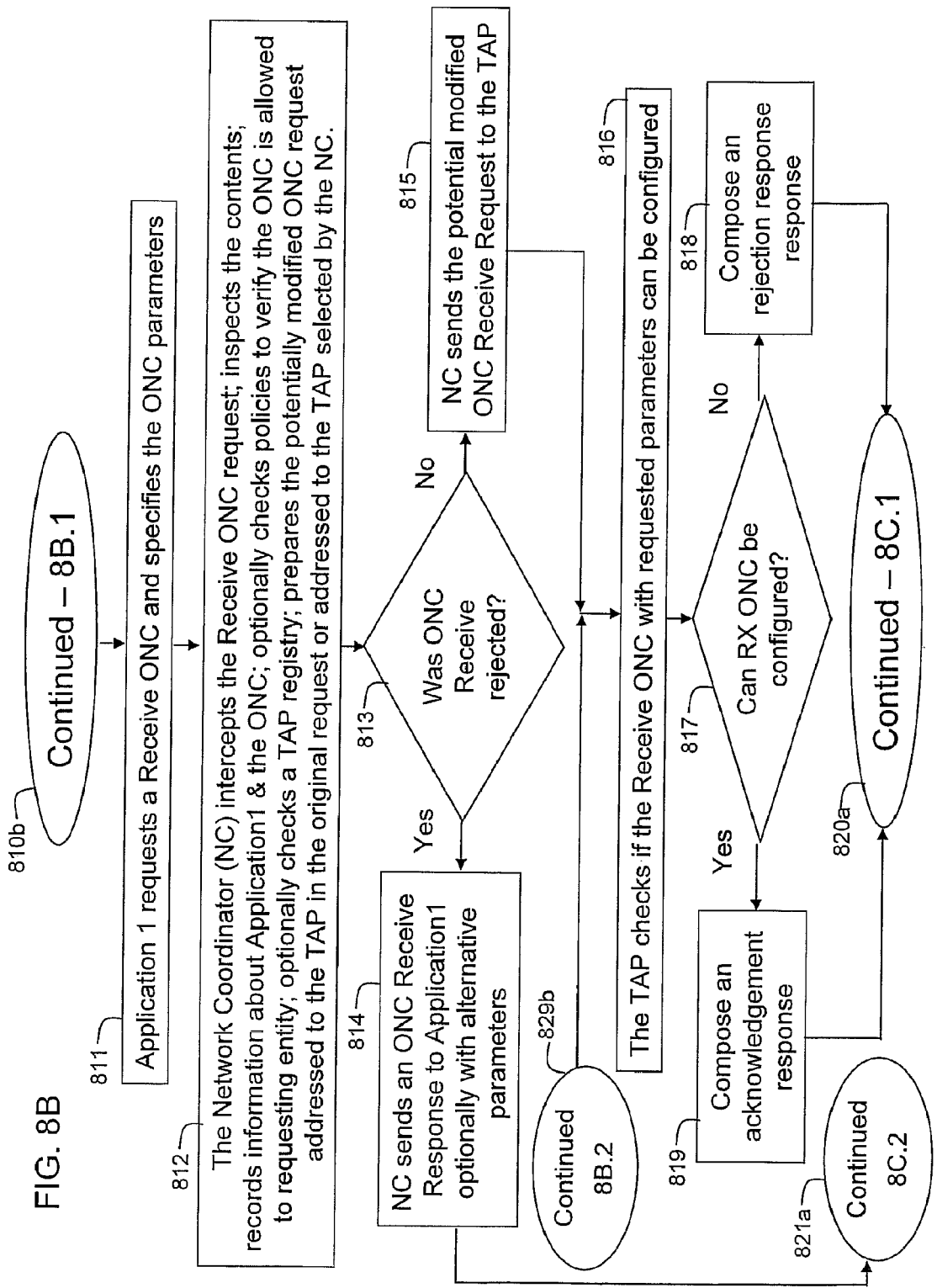
Figure 8C:
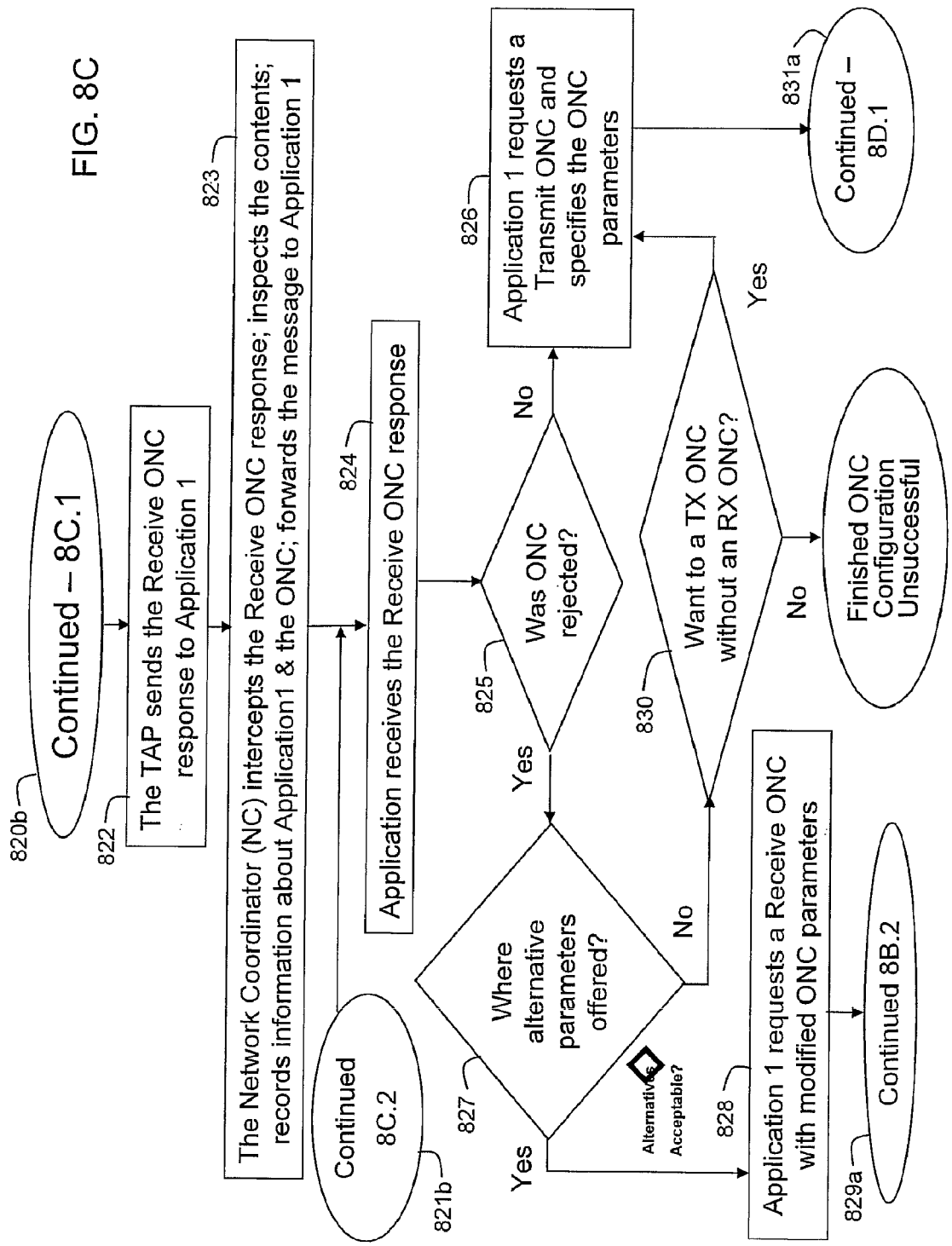
Figure 8D:
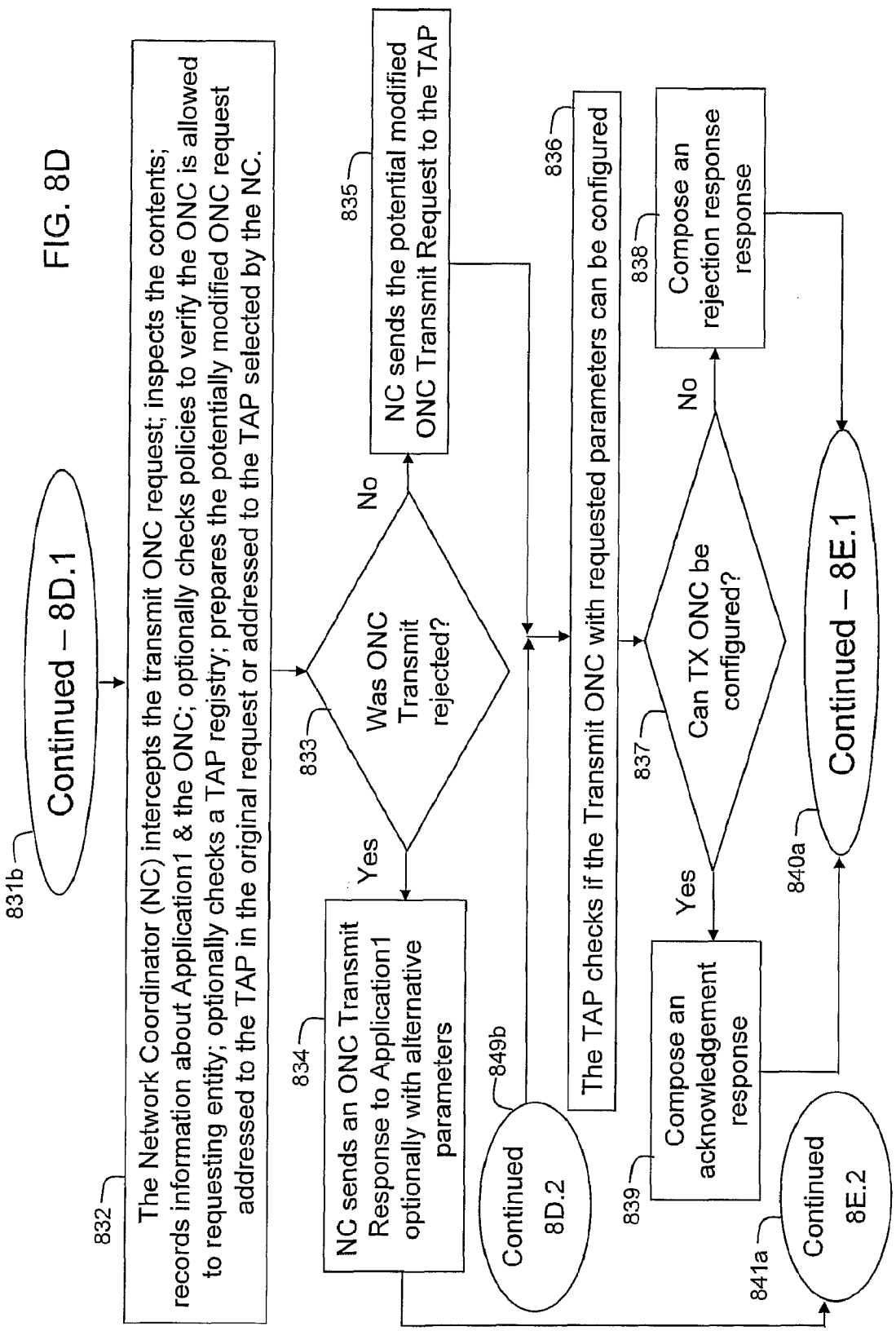
Figure 8E:
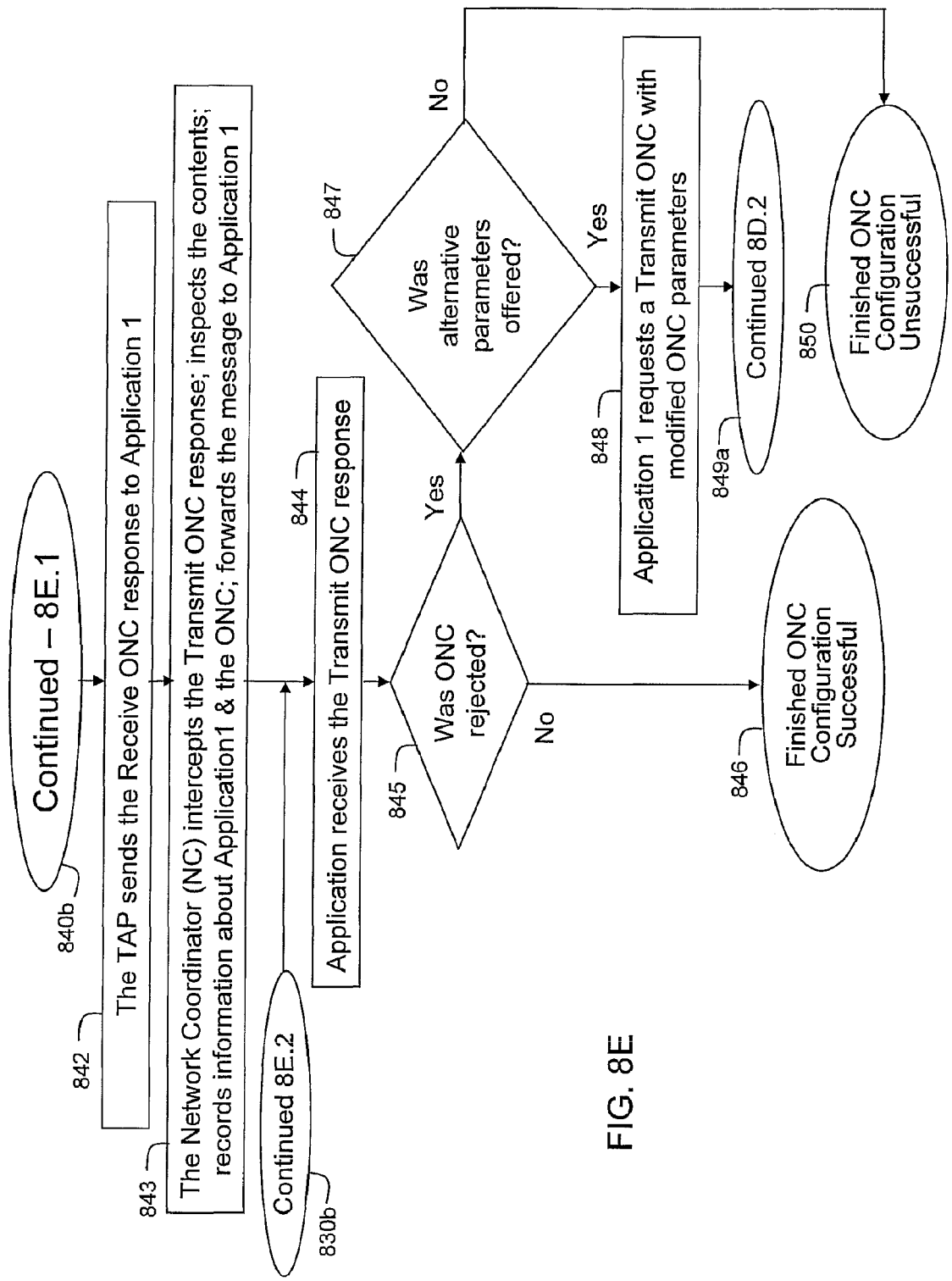

Referring to FIG. 5A, a flowchart is shown of a method 500 for use with the electronic communication network 400 of FIG. 4 according to one embodiment of the present invention. The control/application/service subsystem 400 includes applications 402-404 executing on the control/application/service subsystem 401. The applications 402-404 may, for example, provide network control functions, such as access control, attack control, and application control; applications such as network monitoring, or services such as a web server. Although three applications 402-404 are shown in FIG. 4 for purposes of example, there may be any number of applications.

An Application in the control/application/service subsystem 401 such as Application1 402 requests that it be registered with the TAP subsystem 410 (step 501), such as by transmitting the registration request 421 to the TAP subsystem 410. More specifically, one of the applications 402-404 executing on the control/application/service subsystem 401 may transmit the request 421 to register itself with the TAP subsystem 410 as a Network Resident (NR). Assume for purposes of the following discussion that Application1 402 transmits the request 421. More generally, although the following discussion may refer to the control/application/service subsystem 401 as communicating with the TAP subsystem 410, such communications may be performed by any one of the applications 402-404.

The registration request 421 may, for example, be transmitted by the Application1 402 in response to the application being deployed control/application/service subsystem 401 being in the electronic communication network system 400. Application1 402 may be required to authenticate itself with the TAP subsystem 410 before submitting the registration request 421.

In response to the registration request 421, the TAP subsystem 410 registers the Application1 402 with the TAP subsystem 410 (step 502). As part of the registration, the TAP subsystem 410 may, for example, store registration information 417 descriptive of the Application1 402 in the TAP subsystem 410. For example, the TAP subsystem 410 may generate and store, in the registration information 417, a unique identifier 418 for the Application1 402.

The TAP subsystem 410 confirms that the Application1 402 has been registered with the TAP subsystem 410 (step 503). The TAP subsystem 410 may perform the confirmation by, for example, transmitting the confirmation message 420 to the Application1 402. As part of the confirmation, the TAP subsystem 410 may transmit to the Application1 402 information about capabilities of the connectivity subsystem 110. Such information may, for example, be included in the registration confirmation message 420. The information may indicate, for example, which ONC operating modes and point to point encapsulation and/or encryption schemes the TAP subsystem 410 supports; whether the TAP subsystem 410 supports "deny" mode (in which filtered packets are discarded without being redirected); whether the TAP subsystem 410 supports "allow" mode (in which all packets are forwarded without applying filtering rules to them); which classification fields the TAP subsystem 410 supports (e.g., physical port, MAC address, protocol (e.g., IP, IPX), IP header fields and wildcards, TCP/UDP ports and ranges, traffic rate, date/time, combination of different fields); whether the TAP subsystem 410 supports IPv4, IPv6, or both; and the total number of traffic filtering rules that can be configured in the TAP subsystem 410.

Application1 402 receives the registration confirmation message and records information from the received confirmation message. This information includes the unique Network Resident (NR) Identification (ID) and optionally information about the TAP and its capabilities such as the modes of traffic direction, point to point configuration options, and traffic screening capabilities (step 504).

Application1 402 requests that a Receive ONC be configured such that network traffic 436 be redirected from the TAP subsystem 410 to the Application1 402, such as by transmitting the configure Receive ONC request 440 to the TAP subsystem 410 (step 505). The configure Receive ONC request 440 may include ONC RX parameters 441 for determining which traffic to redirect to the Application1 402; how to set up the point to point connection between the TAP and the application; and what level traffic scanning to remove potentially dangerous traffic is requested. The ONC RX parameters 441 may be defined in any of a variety of ways. For example, the ONC RX parameters 441 may include one or more rules. Each such rule may, for example, specify any one or more of the following criteria: physical port number (or range of physical port numbers), MAC address, VLAN, protocol, IP header source address (or wildcard), IP header destination address (or wildcard), TCP port (or range of TCP ports), UDP port (or range of UDP ports), traffic rate, and date/time (beginning, end, or range) when the rule should be applied. The ONC RX parameters 441 may include any number of rules.

Each rule in the ONC RX parameters 441 may specify an action to be taken for traffic that satisfies the rule. Such actions may include, for example: forwarding the traffic in IP address mode; forwarding the traffic in redirect mode; forwarding the traffic in copy and forward mode; only send counter summary do not send the traffic itself; send only the first n bytes of the packet; allow mode; deny mode; and rate mode. A record of the ONC RX parameters 441 may be stored in the registration information 417 associated with the TAP subsystem 410, so that the TAP subsystem 410 may subsequently apply the ONC RX parameters 441 to determine whether to redirect traffic 436 to the Application1 402.

The ONC parameters may also include security filters the end node wishes the TAP to perform on receive traffic. This filter description may contain one or more names of filters offered by the TAP or full filter descriptions that the TAP may not already offer but the TAP could install it when it installs a new filter loaded via a filter update to the TAP.

The ONC parameters may also include parameters that describe how the traffic will be modified before it is forwarded to the requesting network resident from the TAP. A transmission descriptor contains parameters that indicate addressing to be used on the packet, if and how the packet is to be encapsulated, and if and how to encrypt part or all of the packet, which instructs the TAP how to deliver the packets to the NR.

The TAP subsystem 410 receives the receive ONC request and checks the requested configuration parameters 441 to determine if it can fulfill the request (step 507). If the TAP can not fulfill the Receive ONC configuration request it builds a response message 444 indicating that the request can not be fulfilled and optionally suggests alternative parameters 446 (step 508). If the TAP can fulfill the Receive ONC configuration request it builds a response message 444 indicating that the request has been configured (step 509). The built Receive ONC configuration response message 444 is sent to Application1 402(step 510). The TAP subsystem 410 may perform the response by, for example, transmitting the ONC Receive Response message 444 with optional alternative parameters 446 to the Application1 402.

Application1 402 receives the Receive ONC response message 444 (step 512) and checks if the requested receive ONC has been configured as requested (step 513). If the receive ONC was rejected, then Application1 checks if alternative ONC configuration parameters where suggested by the TAP (step 516). If alternative ONC configuration parameters where suggested and the Application finds the alternative fits its need then, Application1 builds a new receive ONC request message utilizing the alternative parameter suggestions (step 517), otherwise Application1 may choose not to use the alternative suggested parameters and skip configuring a Receive ONC, if so Application1 may move on to step 524. In either case, if the receive ONC was configured or rejected, Application1 may choose to also request a transmit ONC be configured by building and sending a Transmit ONC request message 442 to the TAP (step 514).

The configure Transmit ONC request 442 may include ONC TX parameters 443 for determining how to set up the point to point connection between the TAP and the application; and what level traffic scanning to remove potentially dangerous traffic is requested. The ONC TX parameters 443 may be defined in any of a variety of ways, as with the ONC RX parameters.

The TAP subsystem 410 receives the transmit ONC request and checks the requested configuration parameters 443 to determine if it can fulfill the request (step 519). If the TAP can not fulfill the Transmit ONC configuration request it builds a response message 445 indicating that request can not be fulfilled and optionally suggests alternative parameters 447 (step 521). If the TAP can fulfill the Receive ONC configuration request it builds a response message 445 indicating that request has been configured (step 520). The built Transmit ONC configuration response message 445 is sent to Application1 402 (step 522). The TAP subsystem 410 may perform the response by, for example, transmitting the ONC Transmit Response message 445 with optional alternative parameters 447 to the Application1 402.

Application1 402 receives the Transmit ONC response message 445 (step 526) and checks if the requested transmit ONC has been configured as requested (step 527). If the transmit ONC request was rejected, then Application1 checks if alternative ONC configuration parameters where suggested by the TAP (step 528). If alternative ONC configuration parameters where suggested and the Application finds the alternative fits its need then, Application1 builds a new transmit ONC request message utilizing the alternative parameter suggestions (step 529), else Application1 may choose not to use the alternative suggested parameters and finish unsuccessfully (step 532).

Now referring to FIGS. 6a, 6b, and 6c, three different examples of how receive or transmit ONCs may be configured are shown. In FIG. 6a an ONC may be configured by request of an end node. The resultant ONC is established between the TAP and the end node. At an end node, an application may register as a network resident (NR) and configure receive or transmit or both ONCs between the application and the TAP. Although not shown in FIG. 6a, multiple applications running on an end node may each configure receive or transmit or both ONCs between the each application and the TAP. An end node may choose to implement support for Open Network Connections in the protocol stack in the end node which is shared by the applications running on that end node. This allows for deployment of ONCs without the need for applications to be changed. FIG. 6a shows at the protocol stack of an end node, a protocol stack or a layer within the protocol stack may register as a network resident (NR) and configure receive or transmit or both ONCs between the protocol stack and the TAP. The NIC in an end node could be the entity that registers as a network resident (NR) and configures receive ONCs or transmit ONCs or both, between the NIC and the TAP. Having the NIC implement ONCs allows for deployment of ONCs without the need for application to be changed, also the ONC configuration happens outside the end node operating system for enhanced security. For example this could be implemented in an embedded firewall NIC and offload the traffic scanning to the TAP device.

FIG. 6B shows ONCs configured between an end node and at TAP with a Network Coordinator (NC) acting as an intermediary. In this mode of operation the receive and transmit ONC requests are intercepted by the NC, inspected, possibly modified, possibly rejected by responding back to the end node, or possibly forward to the TAP. The responses back from the TAP, destined to the end node, are also intercepted inspected and forwarded back to the end node. More details of this mode of operation are described below with the descriptions of FIGS. 7 & 8A-8E. As in the previous mode operation shown in FIG.6a, the ONCs can be set up between one or more applications running on an end node, a protocol stack in and end node, or a NIC installed in an end node.

FIG. 6C shows ONCs configured between an end node and at TAP with a Network Coordinator (NC) acting as a master, where the ONCs are assigned to the end node. The end node may or may not be aware of the ONCs being configured. More details of this mode of operation are described below with the descriptions of FIGS. 9 & 10A-E as well as the server load balancer implementation utilizing ONCs described above with the descriptions of FIG. 3G. As in the previous modes operation shown in FIGS. 6a & 6b, the ONCs can bet set up between one or more applications running on an end node, a protocol stack in an end node, or a NIC installed in an end node.

Referring to FIG. 8A, a flowchart is shown of a method 800 for use with the electronic communication network 700 of FIG. 7 according to one embodiment of the present invention. The control/application/service subsystem 700 includes applications 702-704 executing on the control/application/service subsystem 701. The applications 702-704 may, for example, provide network control functions, such as access control, attack control, and application control; applications such as network monitoring of services such as a web server. Although three applications 702-704 are shown in FIG. 7 for purposes of example, there may be any number of applications.

An Application in the control/application/service subsystem 701 such as Application1 702 requests that it be registered with the TAP subsystem 710 (step 801), such as by transmitting the registration request 721a to the TAP subsystem 710. More specifically, one of the applications 702-704 executing on the control/application/service subsystem 701 may transmit the request 721a to register itself with the TAP subsystem 710. Assume for purposes of the following discussion that Application1 702 transmits the request 721a. More generally, although the following discussion may refer to the control/application/service subsystem 701 as communicating with the TAP subsystem 710, such communications may be performed by any one of the applications 702-704.

The registration request 721a may, for example, be transmitted by the Application1 702 in response to the application being deployed control/application/service subsystem 701 being in the electronic communication network system 700. Application1 702 may be required to authenticate itself with the TAP subsystem 710 before submitting the registration request 721a.

The Network Coordinator 750 (NC) intercepts the registration request; inspects the contents; records information about Application1; optionally authenticates and posture checks the requesting entity; optionally checks a TAP registry; prepares the potentially modified request 721b addressed to the TAP in the original request or addressed to the TAP selected by the NC (step 802). The NC may decide to reject or accept the registration request due to network access policies it is enforcing (step 803). If the NC does reject the registration request it will send a registration confirmation message 720a indicating rejection (step 804). Otherwise the NC will forward the registration request 721b to the TAP 710 (step 805).

In response to the registration request 721b, the TAP subsystem 710 registers the Application1 702 with the TAP subsystem 710 (step 806). As part of the registration, the TAP subsystem 710 may, for example, store registration information descriptive of the Application1 702 in the registration subsystem 711. For example, the TAP subsystem 710 may generate and store, in the registration information, a unique identifier for the Application1 702.

The TAP subsystem 710 confirms that the Application1 702 has been registered with the TAP subsystem 710 (step 806). The TAP subsystem 710 may perform the confirmation by, for example, transmitting the confirmation message 720b to the Application1 702. As part of the confirmation, the TAP subsystem 710 may transmit to the Application1 702 information about capabilities of the connectivity (TAP) subsystem 710 as described above in the text describing FIGS. 6 & 7A-C.

The Network Coordinator (NC) 750 intercepts the registration confirmation message 720b; inspects the contents; records information about Application1 702; and forwards the registration confirmation message 720a to Application1 702 (step 808. Application1 702 receives the registration confirmation message 720a and records information the receive message. This information includes the unique Network Resident (NR) Identification (ID) and optionally information about the TAP and its capabilities such as the modes of traffic direction, point to point configuration options, and traffic screening capabilities (step 809).

Application1 702 requests that a Receive ONC be configured such that network traffic 736 be redirected from the TAP subsystem 710 to the Application1 702, such as by transmitting the configure Receive ONC request 740a to the TAP subsystem 710 (step 811). The configure Receive ONC request 740a may include ONC RX parameters 741a for determining which traffic to redirect to the Application1 402; how to set up the point to point connection between the TAP and the application; and what level traffic scanning to remove potentially dangerous traffic is requested as described early in the previous example.

The Network Coordinator (NC) 750 intercepts the Receive ONC request 740a; inspects the contents; records information about Application1 & the ONC; optionally checks policies to verify the ONC is allowed to requesting entity; optionally checks a TAP registry; prepares the potentially modified ONC request addressed to the TAP 710 in the original request or addressed to the TAP selected by the NC (step 812). The NC may decide to reject or accept the Receive ONC request due to network access policies it is enforcing or the NC may have a preferred configuration it will suggest instead of the requested configuration (step 814). The NC sends an ONC receive response message 744a indicating rejection or suggesting alternative parameters for the configuration one the request receive ONC (step 814).

Instead of rejecting the request the NC may choose to modify the configuration parameters of receive ONC request, in behalf of the requester and the NC may send the request to a different TAP than specified in the original request. This feature allows end nodes that do not know to which TAP they should connect, to specify a reserved TAB identifier that indicates the NC should pick the appropriate TAP for this request from this network resident, in this example Application1. If the NC does reject the receive ONC request it forwards receive ONC request message 740b, which may differ from the receive ONC request message 740a it receive from Application1 702 (step 815).

The TAP subsystem 710 receives the receive ONC request and checks the requested configuration parameters (741b not shown) to determine if it can fulfill the request (step 817). If the TAP can not fulfill the Receive ONC configuration request it builds a response message 744b indicating that request can not be fulfilled and optionally suggests alternative parameters (746b not shown) (step 818). If the TAP can fulfill the Receive ONC configuration request it builds a response message 744b indicating that request has been configured (step 819). The built Receive ONC configuration response message 744b is sent to Application1 702(step 822). The TAP subsystem 710 may perform the response by, for example, transmitting the ONC Receive Response message 744b with optional alternative parameters (746b not shown) to the Application1 702.

The Network Coordinator (NC) intercepts 750 the Receive ONC response 744b; inspects the contents; records information about Application1 & the ONC; forwards the message to Application 1 744a (step 823).

Application1 702 receives the Receive ONC response message 744a (step 824) and checks if the requested receive ONC has been configured as requested (step 825). If the receive ONC was rejected, then Application1 checks if alternative ONC configuration parameters where suggested by the TAP (step 827). If alternative ONC configuration parameters where suggested and the Application finds the alternative suggested parameters fits its need then, Application1 builds a new receive ONC request message utilizing the alternative parameter suggestions (step 828), else Application1 may choose not to use the alternative suggested parameters and skip configuring a Receive ONC, if so Application1 may move on to step 826. In either case, if the receive ONC was configured or rejected, Application1 may choose to also request a transmit ONC be configured by building and sending a Transmit ONC request message 742a to the TAP (step 826)

The Network Coordinator (NC) 750 intercepts the transmit ONC request 742a; inspects the contents; records information about Application1 & the ONC; optionally checks policies to verify the ONC is allowed to requesting entity; optionally checks a TAP registry; prepares the potentially modified ONC request addressed to the TAP in the original request or addressed to the TAP selected by the NC (step 832).

The NC may decide to reject or accept the Transmit ONC request (step 833), due to network access policies it is enforcing or the NC may have a preferred configuration it will suggest instead of the requested configuration (step 834). The NC sends an ONC transmit response message 745a indicating rejection or suggesting alternative parameters for the configuration one the request receive ONC Instead of rejecting the request the NC may choose to modify the configuration parameters of the transmit ONC request, in behalf of the requester and the NC may send the request to a different TAP than specified in the original request. This feature allows end nodes that do not know to which TAP they should connect, to specify a reserved TAB identifier that indicates the NC should pick the appropriate TAP for this request from this network resident, in this example Application1 702. If the NC does reject the transmit ONC request it forwards transmit ONC request message 742b, which may differ from the receive ONC request message 742a it receive from Application1 702 (step 835).

The TAP subsystem 710 receives the transmit ONC request and checks the requested configuration parameters (743b not shown) to determine if it can fulfill the request (step 837). If the TAP can not fulfill the Transmit ONC configuration request it builds a response message 745b indicating that request can not be fulfilled and optionally suggests alternative parameters (747b not shown) (step 838). If the TAP can fulfill the Transmit ONC configuration request it builds a response message 745b indicating that request has been configured (step 839). The built Transmit ONC configuration response message 745b is sent to Application1 702 (step 842). The TAP subsystem 710 may perform the response by, for example, transmitting the ONC Receive Response message 745b with optional alternative parameters (747b not shown) to the Application1 702.

The Network Coordinator (NC) 750 intercepts the Transmit ONC response 745b; inspects the contents; records information about Application1 & the ONC; forwards the message 745a to Application 1 (step 843). Application1 702 receives the Transmit ONC response message 745a (step 844) and checks if the requested transmit ONC has been configured as requested (step 845). If the transmit ONC request was rejected, then Application1 checks if alternative ONC configuration parameters where suggested by the TAP (step 847). If alternative ONC configuration parameters where suggested and the Application finds the alternative suggested parameters fits its need then, Application1 builds a new transmit ONC request message utilizing the alternative parameter suggestions (step 848), else Application1 may choose not to use the alternative suggested parameters and finish unsuccessfully (step 850).

Figure 9:
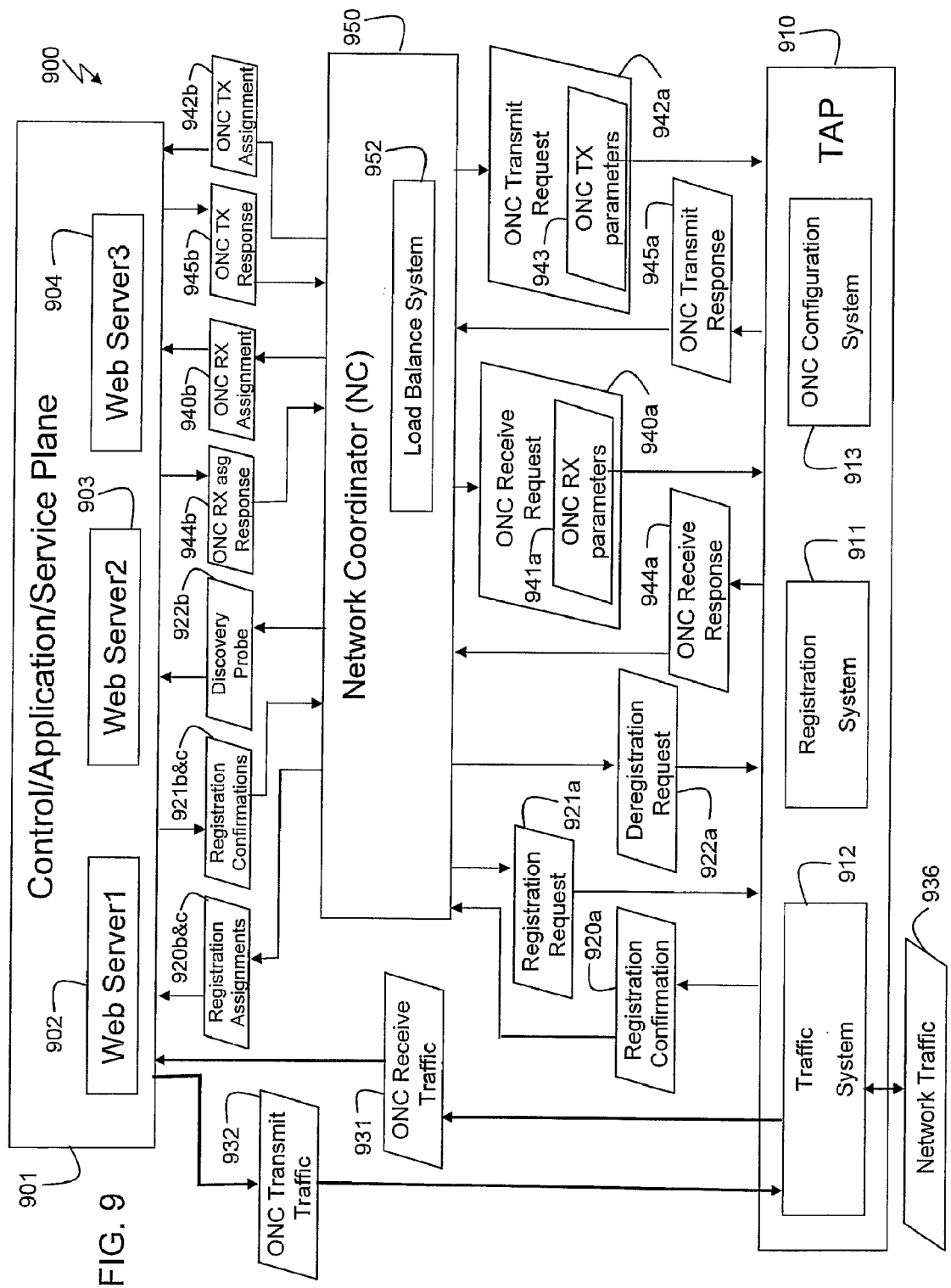
FIG. 9 is a diagram of an electronic communication network according to one embodiment of the present invention with the Network Coordinator(NC)function.
Figure 10A:
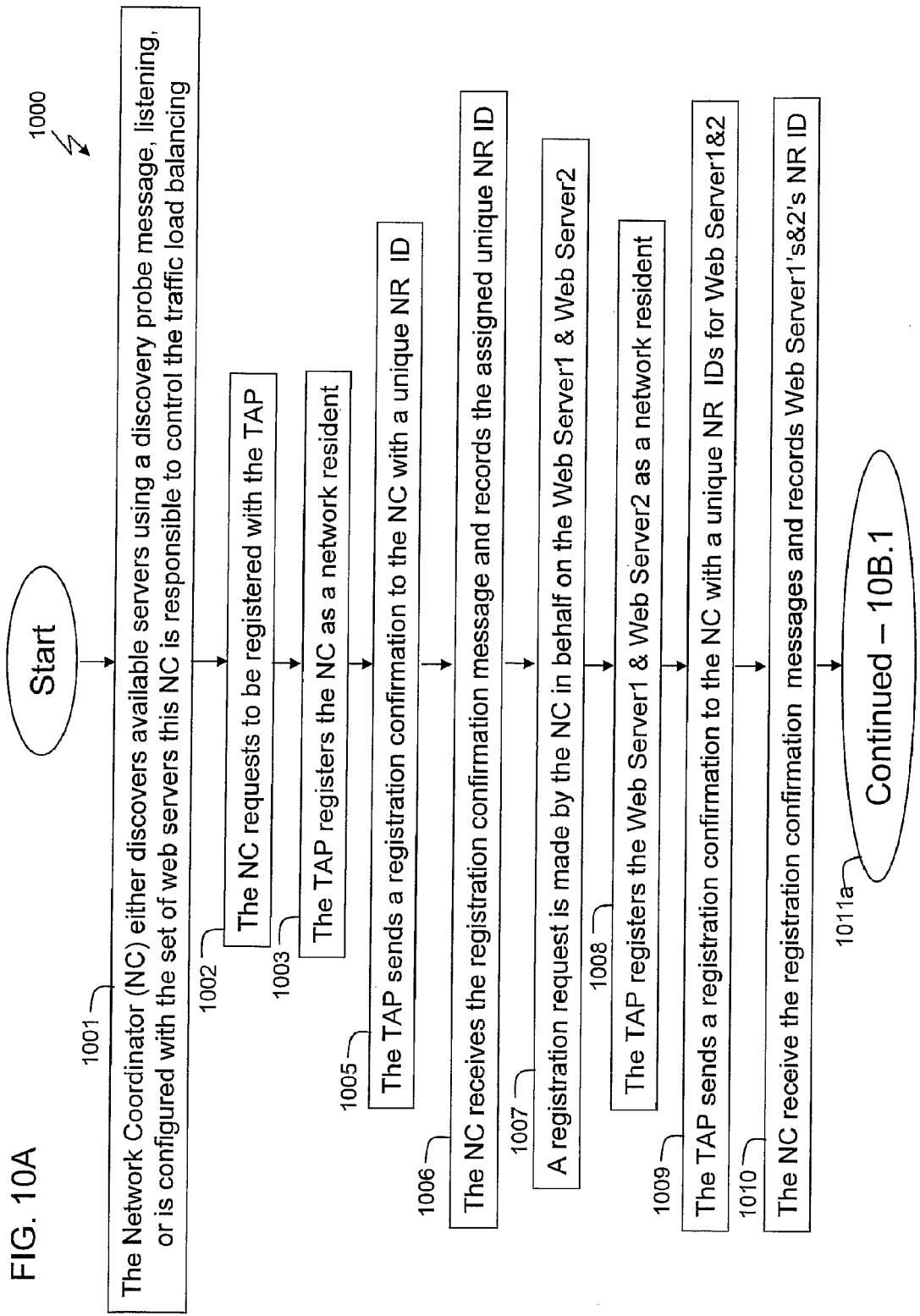
Figure 10C:
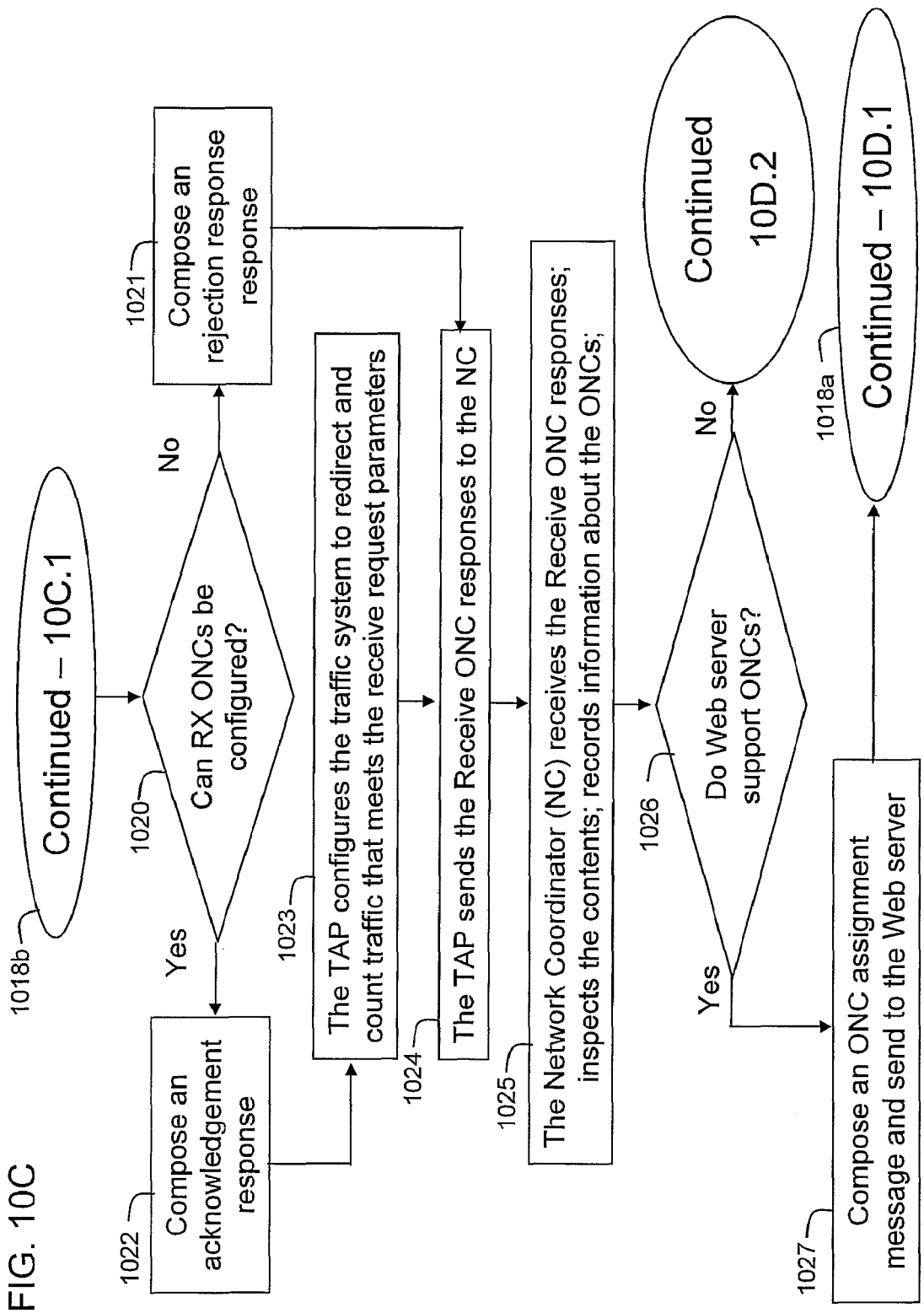
Figure 10D:
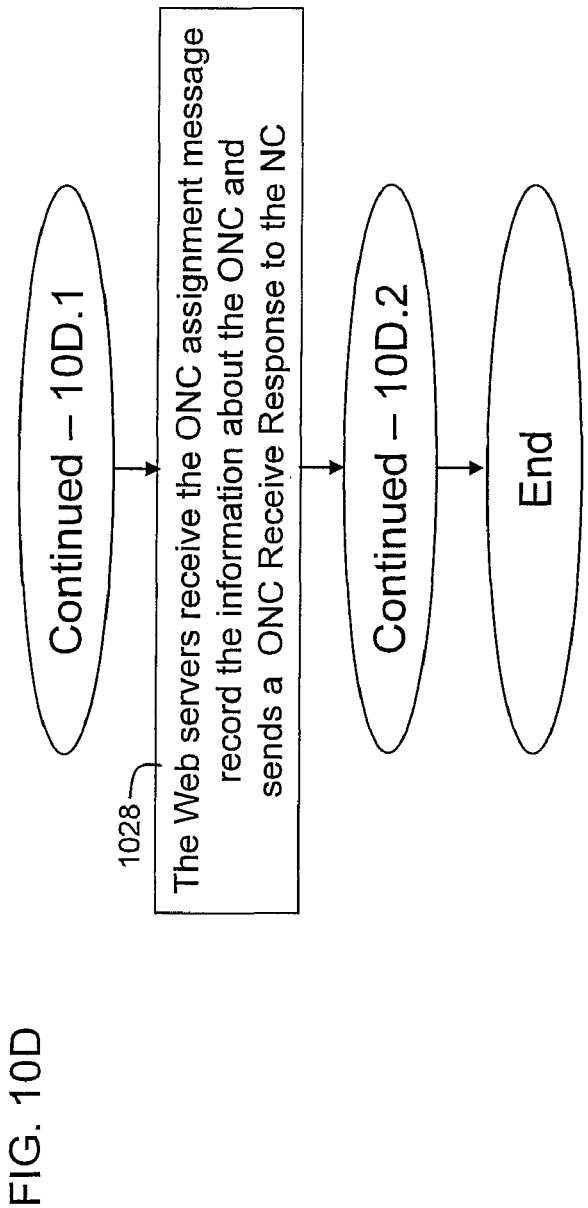

Referring to FIG. 10A, a flowchart is shown of a method 1000 for use with the electronic communication network 900 of FIG. 9 according to one embodiment of the present invention. The application/service subsystem 900 includes applications 902-904 executing on the control/application/service subsystem 901. The applications 902-904 provide web server functions. Although three applications 902-904 are shown in FIG. 9 for purposes of example, there may be any number of applications.

A Network Coordinator (NC) 950 either discovers available servers using a discovery probe message, listening to traffic, or is configured with a list of web servers that this NC is responsible to control the traffic load balancing at step 1001. The NC 950 requests that it be registered with the TAP subsystem 910 (step 1002), such as by transmitting the registration request 921a to the TAP subsystem 910. If the Web servers supported ONCs then they may also register themselves (not shown), but it is not required that Web servers support ONCs.

The registration request 921a may, for example, be transmitted by the NC in response to the Web Server being deployed in the electronic communication network system 900. The NC 950 may be required to authenticate itself with the TAP subsystem 910 before submitting the registration request 921a.

In response to the registration request 921a, the TAP subsystem 910 registers the NC 950 with the TAP subsystem 910 (step 1003). As part of the registration, the TAP subsystem 910 may, for example, store registration information descriptive of the NC 950 in the registration subsystem 911. For example, the TAP subsystem 910 may generate and store, in the registration information, a unique identifier for the NC 950.

The TAP subsystem 910 confirms that the NC 950 has been registered with the TAP subsystem 910 (step 1005). The TAP subsystem 910 may perform the confirmation by, for example, transmitting the confirmation message 920a to the NC 950. As part of the confirmation, the TAP subsystem 910 may transmit to the NC 950 information about capabilities of the connectivity (TAP) subsystem 910 as described above.

The Network Coordinator (NC) 950 receives the registration confirmation message 920a and records information found in the received message. This information includes the unique Network Resident (NR) Identification (ID) and optionally information about the TAP and its capabilities such as the modes of traffic direction, point to point configuration options, and traffic screening capabilities (step 1006).

The NC 950 having been authenticated and registered with the TAP 910, it now issues one or more requests to register Web Server1 902 and Web Server2 903 with the TAP 910 (step 1007). This may de done by a single message listing the network residents to be registered or by individual requests, one per network resident (similar to 921a but not shown). The request message contains the NR ID of the NC 950, as the authenticated entity that has the privileges of not only being a network resident, but also having the privilege to resister other entities in their behalf.

The TAP 910 receives the one or more register request messages sent by the NC 950 and registers Web Server1 and Web Server2 by assigning them each an NR ID and recording this information in the Registration System 911 at step 1008. The fact that the NC 950 is the authorized entity that registered Web Server1 and Web Server2 on their behalf. The Registration System stores the information about the entities responsible for sourcing or sinking network traffic and possibly the authenticated entities that take action on behalf other entities that may or may not support ONCs. This repository of information is used to inspect and manage the logical managed traffic plane for example item N30 in FIG. 3G.

The TAP subsystem 910 may perform the confirmation by, for example, transmitting one or more Registration Confirmation messages (similar to 920a but not known) in response to the one or more registration requests. The one or more message contain the assigned NR IDs for Web Server1 902 and Web Server2 903, and possibly other information about the TAP subsystem 910 (step 1009).

The NC 950 receives the one or more registration response messages and records the NR IDs assigned to Web Server1 and Web Server2 in the Load Balance system 952 at step 1010 and checks if Web Server1 and Web Server2 support ONCs at step 1012. If Web Server1 and Web Server2 do support ONCs then the NC 950 may inform Web Server1 and Web Server2 that they have been registered, what are the assigned NR IDs, and possibly information about TAP to which they are registered by, for example, constructing Registration assignment messages 920b&c and sending them to Web Server1 902 and Web Server2 903 at step 1013. If Web Server1 and Web Server2 do not support ONCs then the registration assignment steps are skipped and go directly to step 1016. The Web Server1 902 and Web Server2 903 receive the Registration assignment messages 920b&c and record their assigned NR IDs at step 1014. Web Server1 902 and Web Server2 903 respond by sending registration messages 921b&c to the NC 950 at step 1015.

The NC 950 constructs a Receive Request ONC message (example 940a) for each Web Server specifying receive filter criteria contained in the ONC RX parameters (example 941a). The filter criteria is constructed such that the network traffic will be balanced across the Web Servers, also the level of traffic screening may also be specified in the ONC RX parameters (example 941a) to protect the particular service the Web Server provides. For each Receive ONC constructed for Web Servers another Receive ONC is constructed as a counter only ONC to connected to the NC 950, to enable the NC 950 to monitor the load on Web Server1 902 and Web Server2 903 at step 1016.

The TAP 910 checks if the Receive ONC requests (example 940a) with parameters (example 941a) can be configured, records information about the configured ONC and notes the linkage between counter only ONC and the Web Servers ONCs in the ONC Configuration system 913 at step 1017. If the TAP 910 can configure the ONC RX requests, it composes acknowledgement receive response message (example 944a) at step 1022 and configures the traffic system to redirect and count traffic that meets the receive request parameters at step 1023.

If the TAP 910 can not configure the ONC RX requests, it composes rejection receive response message (example 944a) at step 1021. At step 1024 the acknowledgement or reject receive response is sent to the NC 950. The Network Coordinator 950 receives the Receive ONC responses, inspects the contents, records information about the ONCs in the load balance system 952 at step 1025. If the Web servers support ONCs and the ONC receive request were acknowledged then the NC 950 composes ONC assignment messages (example 940b) at step 1027. The web servers would receive the ONC receive assignment messages, record the information about the ONC and send ONC receive assignment responses (example 944b) at step 1028.

Optionally (not shown in FIG. 10), if the NC 950 wants the traffic sent by the web servers to be managed, then it will set up transmit ONCs with the TAP 910. These ONC are set up by composing and sending ONC transmit request messages (example 942a) to the TAP 950 in behalf of the web servers. The TAP 910 will receive the ONC transmit request messages, record them with the registration system 911, and respond with ONC transmit response messages (example 945a). If the web servers support ONCs, then the NC 950 will inform the web servers that transmit ONCs are established by sending ONC transmit assignment messages (example 942b). The web servers will receive the ONC transmit assignment messages, record the information about the ONC and send ONC transmit assignment responses (example 945b) back to the NC 950.

A variety of protocols could be used between the end nodes, network coordinators and TAPs; simple request response protocols like SNMP could be used by the TAP to request receive and transmit ONCs; the TAP could have a web services server interface and SOAP could be used to configured ONCs; or any other protocol that could configure the ONC as described in this disclosure.

Whichever protocols are used to perform NR registration, ONC configuration, or traffic redirection as a result of ONC configuration; the following describes information that may be present in the implementation of specific protocol messages. Not all the information fields discussed below are required for each implementation.

An application or end node that requests to be a registered NR must provide some form of identification. Possible forms of identification can range from a 48 bit MAC address, to credit card number, to a passport number, to a URL. The important characteristic of this provided identification is that the source (TX ONC) and sink (RX ONC) of network traffic can be associated with an identifiable entity, such as a person, machine, company, or any other form of responsible entity. Other information may also be present in the registration request describing the NR such as who it is, where it is, and it capabilities. As discussed above, a NR ID may be offered as a suggestion to the TAP, because the NR has previously received this NR ID from this TAP or another TAP.

The registration confirmation message must provide an NR ID if the registration request is granted. The registration confirmation message must also contain an indication if the registration has been granted. Other information may be provided by the TAP, as well as information copied from the registration request message. Information about this TAP and other TAPs may be provided in the registration confirmation message. Information provided about the TAPs may indicate the TAP ID, the TAP location, and the capabilities of the TAP, and present load loaded supported by the TAP. The capabilities of the TAP reported in the confirmation message may describe its filtering, packet redirection modes, packet modification modes, and encryption support. This information can be useful to the NR to locate other TAPs and to determine if the needed ONCs can be met by the TAPs.

The Deregistration request message must at least contain the NR ID that is disconnecting from the logical topology. The Deregistration request message may optionally contain information such as the reason for disconnecting, where the NR intends to reconnect, and information about the usage of the ONC that is being disconnected.

Receive ONC request messages must at a minimum supply the NR ID of the requester and traffic redirection instructions. The NR ID is the ID provided when it registered with this TAP. The traffic redirection instructions can take various forms from selecting the default configured in the TAP to specifying complicated traffic selection criteria. Also how the redirected traffic is to sent from the TAP to NR may be specified, which could include items such as packet transformation instructions to encapsulate, tag, or encrypt; traffic scrutiny instructions to scan the redirected traffic for security threats; and whether all, part, or another form of traffic representation, such as counters, should be sent instead of redirecting the actual traffic.

The Receive ONC request message may contain traffic logging instructions to the TAP which can be gathered at a later date to track traffic associated with this ONC. The Receive ONC request message may also contain an indication that this RX ONC is to be directly connected to a TX ONC and if a direct connection is indicated, then an identification of which TX ONC this RX ONC is directly connected. If more than one TX ONCs are allowed per NR then the TX ONC ID must be provided, else the NR ID may identify the TX ONC.

The ONC Receive Response message must contain an indication if the requested RX ONC has been granted. If the TAP allows more than one RX ONC per NR, then the ONC Receive Response message must also contain an ONC identifier (ONC ID). This ONC ID can be used by the NR or NC to associate the redirected traffic to the ONC that caused the traffic redirection. The TAP may also copy information from the ONC Receive Request in the response message.

Transmit ONC Request messages must at a minimum supply the NR ID of the requester. Information about the how traffic is to be sent from the NR to the TAP, traffic modification, traffic priority, and traffic scrutiny as described in the RX ONC may also be supplied in the Transmit ONC request message. The Transmit ONC request message may contain traffic logging instructions to the TAP which can be gathered at a later date to track traffic associated with this ONC. Also information about a direct connection between this TX ONC and an RX ONC may also be provided in the Transmit ONC Request message.

Transmit ONC Response messages must contain an indication if the requested TX ONC has been granted. If the TAP allows more than one TX ONC per NR, then the ONC Transmit Response message must also contain an ONC identifier (ONC ID). This ONC ID can be used by the NR or NC to associate the traffic to the ONC that sourced this traffic. The TAP may also copy information from the ONC Transmit Request in the response message.

What is claimed is:

1. A traffic access provider comprising:
   traffic reception circuitry to receive network traffic from a network resident over a local area network (LAN), the network traffic comprising a network resident identifier;
   filter determination logic to determine whether the network traffic satisfies a specified network traffic filter, wherein the specified network traffic filter is included in a request communicated by the network resident;
   traffic modification logic to modify the network traffic to produce modified network traffic if the network traffic satisfies the specified network traffic filter; and
   traffic sending logic to send the modified network traffic to the network resident over the LAN on an established connection if the network traffic satisfies the specified network traffic filter, wherein the request communicated by the network resident further includes a specification of a particular level of network traffic security screening.

2. The traffic access provider according to claim 1, further comprising:
security screening logic to determine whether the network traffic satisfies the particular level of network traffic security screening; and
wherein the traffic sending logic comprises logic to send the modified network traffic to the network resident over the LAN on the established connection only if the network traffic satisfies the particular level of network traffic security screening.

3. A traffic access provider comprising:
traffic reception circuitry to receive network traffic from a network resident over a local area network (LAN), the network traffic comprising a network resident identifier;
filter determination logic to determine whether the network traffic satisfies a specified network traffic filter, wherein the specified network traffic filter is included in a request communicated by the network resident and wherein the network traffic identifies parameters of the specific network traffic;
traffic modification logic to modify the network traffic to produce modified network traffic if the network traffic satisfies the specified network traffic filter; and
traffic sending logic to send the modified network traffic to the network resident over the LAN on an established connection if the network traffic satisfies the specified network traffic filter, wherein the traffic modification logic comprises logic to modify the network traffic in accordance with a managed connection transmission descriptor associated with the network connection to produce the modified network traffic.

4. The traffic access provider according to claim 3, wherein the request includes the managed connection transmission descriptor.

5. The traffic access provider according to claim 3, further comprising:
logic to associate the managed connection transmission descriptor with a managed network connection with the network resident.

6. The traffic access provider according to claim 5, wherein the managed network connection comprises a receive-only connection.

7. A traffic access provider comprising:
traffic reception circuitry to receive network traffic from a network resident over a local area network (LAN), the network traffic comprising a network resident identifier;
filter determination logic to determine whether the network traffic satisfies a specified network traffic filter, wherein the specified network traffic filter is included in a request communicated by the network resident and wherein the network traffic identifies parameters of the specific network traffic;
traffic modification logic to modify the network traffic to produce modified network traffic if the network traffic satisfies the specified network traffic filter; and
traffic sending logic to send the modified network traffic to the network resident over the LAN on an established connection if the network traffic satisfies the specified network traffic filter; and
connection establishment logic to establish a managed network connection with the network resident in response to receipt of the request including the specification of a network traffic filter and the network resident identifier.

8. The traffic access provider according to claim 7, wherein the request further includes traffic screening specification identifying authorized transmitting of Open Network Connections corresponding to data transmitters from which the network resident will receive data.

9. The traffic access provider according to claim 8, further comprising:
connection establishment logic to establish a transmit-only managed network connection with the network resident in response to the request.

10. A method for controlling local area networking (LAN) traffic comprising:
receiving network traffic over the LAN, the network traffic comprising an identifier of a network resident;
determining whether the network traffic satisfies a specified network traffic filter, wherein the specified network filter is included in a received request;
modifying the network traffic to produce modified network traffic if the network traffic satisfies the specified network traffic filter; and
sending the modified network traffic to the network resident over the LAN on any connection established with the network resident if the network traffic satisfies the specified network traffic filter, wherein the request communicated by the network resident further includes a specification of a particular level of network traffic security screening;
determining whether the network traffic satisfies the particular level of network traffic security screening; and
sending the modified network traffic to the network resident over the LAN on the established connection only if the network traffic satisfies the particular level of network traffic security screening.

11. The method according to claim 10, further comprising:
registering an end node as the network resident; and
assigning the resident identifier to the network resident.

12. A method for controlling local area networking (LAN) traffic comprising:
receiving network traffic over the LAN, the network traffic comprising an identifier of a network resident;
determining whether the network traffic satisfies a specified network traffic filter, wherein the specified network filter is included in a received request and wherein the network traffic identifies parameters of the specific network traffic;
modifying the network traffic to produce modified network traffic if the network traffic satisfies the specified network traffic filter; and
sending the modified network traffic to the network resident over the LAN on any connection established with the network resident if the network traffic satisfies the specified network traffic filter; and
modifying the network traffic in accordance with a managed connection transmission descriptor associated with the network connection to produce the modified network traffic.

13. A method for controlling local area networking (LAN) traffic comprising:
receiving network traffic over the LAN, the network traffic comprising an identifier of a network resident;
determining whether the network traffic satisfies a specified network traffic filter, wherein the specified network filter is included in a received request and wherein the network traffic identifies parameters of the specific network traffic;

modifying the network traffic to produce modified network traffic if the network traffic satisfies the specified network traffic filter; and sending the modified network traffic to the network resident over the LAN on any connection established with the network resident if the network traffic satisfies the specified network traffic filter; and establishing a managed network connection with the network resident in response to receipt of the request including the specification of a network traffic filter and the network resident identifier.

* * * * *